United States Patent
Veit et al.

(10) Patent No.: US 11,216,912 B2
(45) Date of Patent: Jan. 4, 2022

(54) CHROMINANCE DENOISING

(71) Applicant: GoPro, Inc., San Mateo, CA (US)

(72) Inventors: Thomas Nicolas Emmanuel Veit, Meudon (FR); Marc Lebrun, Issy-les-Moulineaux (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/756,732

(22) PCT Filed: Oct. 17, 2018

(86) PCT No.: PCT/US2018/056220
§ 371 (c)(1),
(2) Date: Apr. 16, 2020

(87) PCT Pub. No.: WO2019/079398
PCT Pub. Date: Apr. 25, 2019

(65) Prior Publication Data
US 2021/0166354 A1 Jun. 3, 2021

Related U.S. Application Data

(60) Provisional application No. 62/573,806, filed on Oct. 18, 2017.

(51) Int. Cl.
*G06K 9/46* (2006.01)
*G06T 5/00* (2006.01)
*G06K 9/62* (2006.01)

(52) U.S. Cl.
CPC ............ *G06T 5/002* (2013.01); *G06K 9/4609* (2013.01); *G06K 9/4652* (2013.01);
(Continued)

(58) Field of Classification Search
CPC .......... G06T 5/002; G06T 2207/20182; G06T 2207/10024; G06K 9/4661; G06K 9/6202; G06K 9/4652; G06K 9/4609
(Continued)

(56) References Cited

U.S. PATENT DOCUMENTS 6,661,470 B1 * 12/2003 Kawakami ........... G09G 3/2022
348/699
8,254,718 B2 * 8/2012 Bennett .................. G06T 5/002
382/275

(Continued)

OTHER PUBLICATIONS

Buades et al., "Non-Local Means Denoising", Image Processing On Line on Sep. 13, 2011, ISSN 2105-1232, http://dx.doi.org/10.5201/ipol.2011.bcm_nlm, pp. 208-212.
(Continued)

*Primary Examiner* — Ali Bayat
(74) *Attorney, Agent, or Firm* — Young Basile Hanlon & MacFarlane, P.C.

(57) ABSTRACT

Systems and methods are disclosed for denoising chrominance channels of images. For example, methods may include receiving an image from one or more image sensors; determining a set of weights for the image based on a luminance channel of the image, wherein a weight in the set of weights corresponds to a subject pixel and a candidate pixel and is determined based on luminance values of one or more pixels of the image centered at the subject pixel and one or more pixels of the image centered at the candidate pixel; applying the set of weights to chrominance channels of the image to obtain a denoised image, wherein the subject pixel of the denoised image is determined based on the weight multiplied by the candidate pixel of the image; and storing, displaying, or transmitting an output image based on the denoised image.

20 Claims, 10 Drawing Sheets

(52) U.S. Cl.
CPC ......... *G06K 9/4661* (2013.01); *G06K 9/6202*
(2013.01); *G06T 2207/10024* (2013.01); *G06T 2207/20182* (2013.01)

(58) Field of Classification Search
USPC ........................................................ 382/275
See application file for complete search history.

(56) References Cited

U.S. PATENT DOCUMENTS

| | | | | |
|---|---|---|---|---|
| 2005/0128355 | A1* | 6/2005 | Kang | H04N 5/208 348/606 |
| 2009/0040386 | A1* | 2/2009 | Ishiga | G06T 5/002 348/607 |
| 2009/0046943 | A1* | 2/2009 | Ishiga | G06T 7/13 382/266 |
| 2011/0249151 | A1* | 10/2011 | Ito | G06T 5/002 348/241 |
| 2013/0064448 | A1* | 3/2013 | Tomaselli | G06T 5/002 382/167 |
| 2013/0329135 | A1* | 12/2013 | Baqai | H04N 9/646 348/624 |
| 2015/0055862 | A1 | 2/2015 | Omayu | |
| 2017/0084007 | A1* | 3/2017 | Rakhshanfar | H04N 5/21 |

OTHER PUBLICATIONS

International Search Report and Written Opinion for PCT/US2018/056220, dated Jan. 8, 2019, 12 pages.

Jingjing Dai et al.: "Color image denoising based on multichannel non-local means fusion", Image Processing (ICIP), 2012 19th IEEE International Conference ON, IEEE, Sep. 30, 2012 (Sep. 30, 2012), pp. 1193-1196, XP032333391, DOI: 10.1109/ICIP.2012.6467079, ISBN: 978-1-4673-2534-9.

* cited by examiner

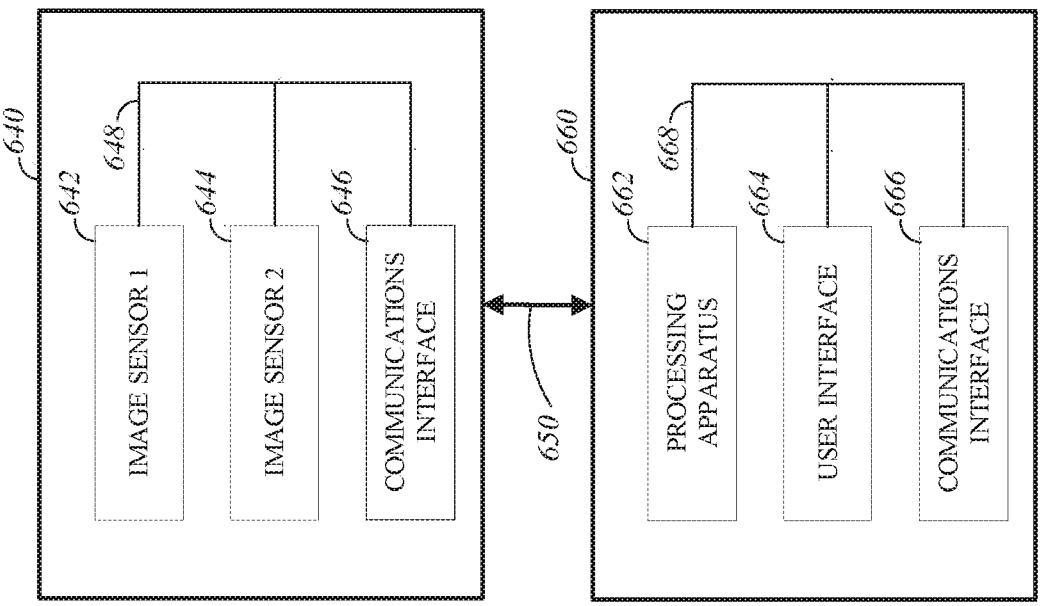
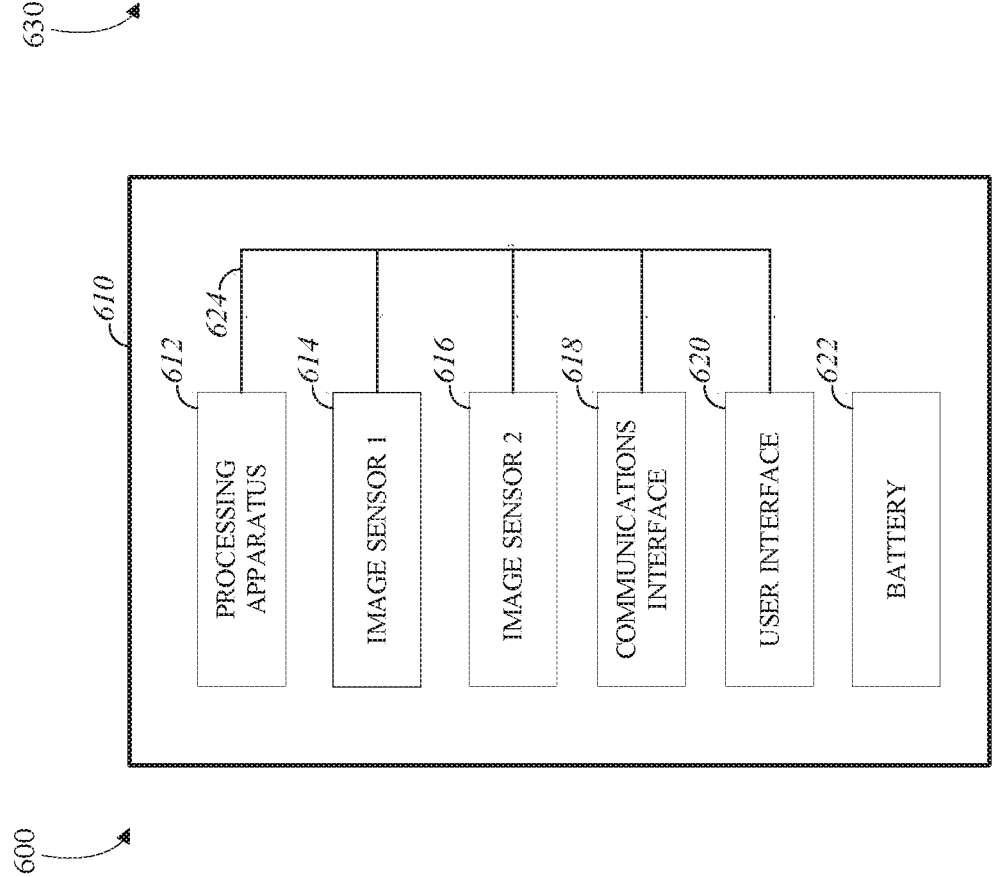
FIG. 6B
FIG. 6A

CHROMINANCE DENOISING

CROSS-REFERENCE TO RELATED APPLICATION(S)

This application claims the benefit of U.S. Application No. 62/573,806, filed on Oct. 18, 2017, which is incorporated herein by reference in its entirety.

TECHNICAL FIELD

The present disclosure relates to denoising chrominance channels of images.

BACKGROUND

Image capture devices, such as cameras, may capture content as images (e.g., still images or frames of video). Light may be received and focused via a lens and may be converted to an electronic image signal by an image sensor. The image signal may be processed by an image signal processor (ISP) to form an image, which may be stored and/or encoded. In some implementations, multiple images or video frames may include spatially adjacent or overlapping content. Accordingly, systems, methods, and apparatus for capturing, processing, and/or encoding images, video, or both may be advantageous.

SUMMARY

The present disclosure describes, inter alia, apparatus and methods for denoising chrominance channels of images.

In a first aspect, the subject matter described in this specification can be embodied in systems that include an image sensor configured to capture an image and a processing apparatus that is configured to: receive the image from the image sensor; determine a set of weights for the image based on a luminance channel of the image, wherein a weight in the set of weights corresponds to a subject pixel and a candidate pixel and is determined based on luminance values of one or more pixels of the image centered at the subject pixel and one or more pixels of the image centered at the candidate pixel; apply the set of weights to a chrominance channel of the image to obtain a denoised image, wherein the subject pixel of the denoised image is determined based on the weight multiplied by the candidate pixel of the image; and store, display, or transmit an output image based on the denoised image.

In a second aspect, the subject matter described in this specification can be embodied in methods that include receiving an image from one or more image sensors; determining a set of weights for the image based on a luminance channel of the image, wherein a weight in the set of weights corresponds to a subject pixel and a candidate pixel and is determined based on luminance values of one or more pixels of the image centered at the subject pixel and one or more pixels of the image centered at the candidate pixel; applying the set of weights to chrominance channels of the image to obtain a denoised image, wherein the subject pixel of the denoised image is determined based on the weight multiplied by the candidate pixel of the image; and storing, displaying, or transmitting an output image based on the denoised image.

In a third aspect, the subject matter described in this specification can be embodied in systems that include an image sensor configured to capture an image and a processing apparatus that is configured to: receive the image from the image sensor; determine a set of non-local means weights for the image based on a luminance channel of the image; apply the set of non-local means weights to a chrominance channel of the image to obtain a denoised image; and store, display, or transmit an output image based on the denoised image.

These and other aspects of the present disclosure are disclosed in the following detailed description, the appended claims, and the accompanying figures.

BRIEF DESCRIPTION OF THE DRAWINGS

The disclosed embodiments have other advantages and features which will be more readily apparent from the detailed description, the appended claims, and the accompanying figures. A brief introduction of the figures is below.

FIG. 6A is a block diagram of an example of a system configured for image capture.

FIG. 6B is a block diagram of an example of a system configured for image capture.

Figure 1:
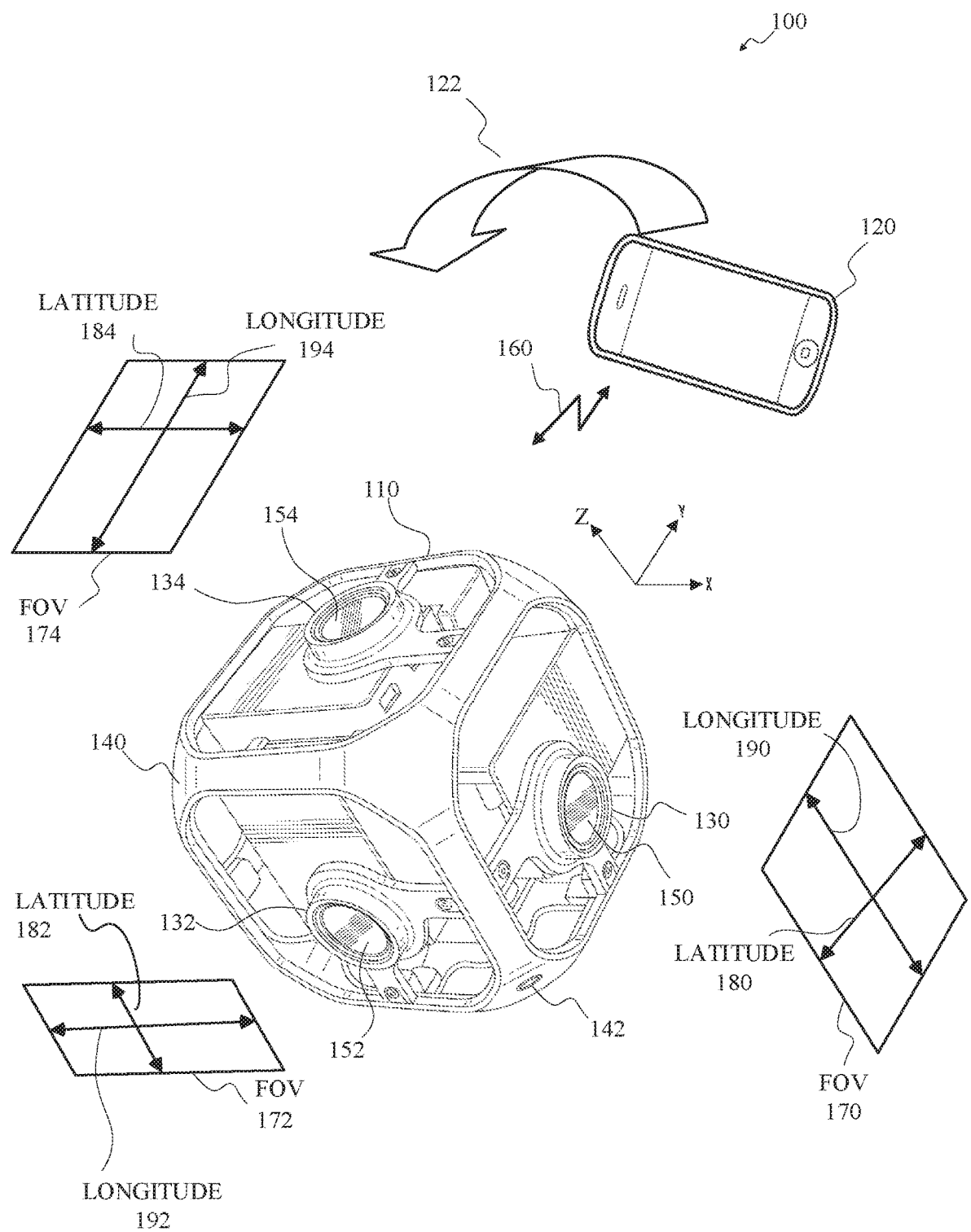
FIG. 1 is a diagram of an example of an image capture system for content capture.

All figures disclosed herein are © Copyright 2018 GoPro Inc. All rights reserved.

DETAILED DESCRIPTION

Content, such as visual content, may be captured as one or more images (e.g., still images or video frames) by one or more image capture devices, such as a camera or camera array. An image capture device may include one or more lenses, image sensors, image signal processors, encoders, or combinations thereof. A lens may receive and focus light on an image sensor or sensors. An image sensor or sensors may sample the light and generate an electronic image signal. An image signal processor (ISP) may receive the image signal from one or more sensors and may process the image signal to generate an image, picture, or frame. The generated images may be stored, such as in a memory of an image capture device, and/or sent to an encoder for encoding, which may include compression. When image is captured by a sensor device, noise is present and it is desirable to suppress this noise.

A technique for reducing noise levels of pixels in a captured image is non-local means noise reduction. Non-local means noise reduction updates pixels values based on the values of other pixels in the same image with similar values to the pixel being updated. A pixel being updated may be referred to as a subject pixel and one or more pixels used to update the subject pixel may be referred to as candidate pixels. The extent to which a particular candidate pixel is relied upon in updating the subject pixel may depend on how similar the value of the candidate pixel is to the starting value of the candidate pixel (e.g., to the color proximity of the pixels). For example, a subject pixel may be updated based on a weighted average of candidate pixels and (or including) the subject pixel. A weight that is multiplied by a candidate pixel to update a subject pixel may be determined based on a measure of similarity (e.g., an absolute difference) between values of the subject pixel and the candidate pixel. Once a set of weights, respectively corresponding to allowed pairs of subject pixel and candidate pixel, are determined, this set of weights may be applied to an image to update its pixels and obtain a denoised image.

For example, a set of weights may include a subset of weights for each pixel of the image as the subject pixel. In some implementations, one of these subsets of weights may include weights for candidate pixels in a window centered at the subject pixel. For example, a weight may be determined based on based on the color proximity of a patch or area of pixels centered on the subject pixel and a corresponding patch or area of pixels centered on the candidate pixel. A set of weights may then be applied to an image to denoise the image. For example, the value of a subject pixel may be replaced with a value determined as a weighted average of the candidate pixels for that subject pixel weighted by their respective weights from the set of weights.

A guided filtering may be applied to reduce noise on chrominance channels of an image. A set of weights for a filter (e.g., a non-local means filter) may be determined based on a luminance channel of the image and then applied to one or more chrominance channels of the image to obtain a denoised image. In some implementations, the set of filter weights may be determined based on the luminance channel and chrominance channels of the image and then applied to one or more of the chrominance channels. This approach of guided filtering of chrominance channels based on weights determined based on a luminance channel may provide a computational resource efficient means for chroma noise reduction of a captured image.

For example, this guided chroma denoising may be applied to images that have been output from an image signal processor before the images are passed into an encoder. Such an arrangement may enable additional color enhancement in software beyond what an image signal processor is configured to perform. In some implementations, this guided chroma denoising may be applied to decoded images that that are obtained from decoding an encoded bitstream bearing (e.g., an MPEG encoded bitstream). Such an arrangement may enable mitigation of color distortions introduced by a video or still image coding scheme.

In some implementations, a set of weights used for chroma denoising may be applied multiple times to the chrominance channels of the image. By iteratively applying the set of weights to denoised images based on the image, the noise levels of the chrominance channels of the pixels may be further reduced. Because the process of determining a set of weights may be significantly more computationally complex that the process of applying the set of weights to an image, the added cost of repeated application of the set of weights may have a marginal impact on the overall complexity and substantially improve the quality of the chroma denoising algorithm.

As used in this specification, the term "luminance" refers to a component in a color space that encodes an overall brightness of a pixel or other image portion. The term luminance is used interchangeably with the term luma herein.

Implementations are described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIG. 1 is a diagram of an example of an image capture system 100 for content capture in accordance with implementations of this disclosure. As shown in FIG. 1, an image capture system 100 may include an image capture apparatus 110, an external user interface (UI) device 120, or a combination thereof.

In some implementations, the image capture apparatus 110 may be a multi-face apparatus and may include multiple image capture devices, such as image capture devices 130, 132, 134 as shown in FIG. 1, arranged in a structure 140, such as a cube-shaped cage as shown. Although three image capture devices 130, 132, 134 are shown for simplicity in FIG. 1, the image capture apparatus 110 may include any number of image capture devices. For example, the image capture apparatus 110 shown in FIG. 1 may include six cameras, which may include the three image capture devices 130, 132, 134 shown and three cameras not shown.

In some implementations, the structure 140 may have dimensions, such as between 25 mm and 150 mm. For example, the length of each side of the structure 140 may be 105 mm. The structure 140 may include a mounting port 142, which may be removably attachable to a supporting structure, such as a tripod, a photo stick, or any other camera mount (not shown). The structure 140 may be a rigid support structure, such that the relative orientation of the image capture devices 130, 132, 134 of the image capture apparatus 110 may be maintained in relatively static or fixed alignment, except as described herein.

The image capture apparatus 110 may obtain, or capture, image content, such as images, video, or both, with a 360° field-of-view, which may be referred to herein as panoramic or spherical content. For example, each of the image capture devices 130, 132, 134 may include respective lenses, for receiving and focusing light, and respective image sensors for converting the received and focused light to an image signal, such as by measuring or sampling the light, and the multiple image capture devices 130, 132, 134 may be arranged such that respective image sensors and lenses capture a combined field-of-view characterized by a spherical or near spherical field-of-view.

In some implementations, each of the image capture devices 130, 132, 134 may have a respective field-of-view 170, 172, 174, such as a field-of-view 170, 172, 174 that 90° in a latitudinal dimension 180, 182, 184 and includes 120° in a longitudinal dimension 190, 192, 194. In some implementations, image capture devices 130, 132, 134 having overlapping fields-of-view 170, 172, 174, or the image sensors thereof, may be oriented at defined angles, such as at 90°, with respect to one another. In some implementations, the image sensor of the image capture device 130 is directed along the X axis, the image sensor of the image capture device 132 is directed along the Y axis, and the image sensor of the image capture device 134 is directed along the Z axis. The respective fields-of-view 170, 172, 174 for adjacent image capture devices 130, 132, 134 may be oriented to allow overlap for a stitching function. For example, the longitudinal dimension 190 of the field-of-view 170 for the image capture device 130 may be oriented at 90° with respect to the latitudinal dimension 184 of the field-of-view 174 for the image capture device 134, the latitudinal dimension 180 of the field-of-view 170 for the image capture device 130 may be oriented at 90° with respect to the longitudinal dimension 192 of the field-of-view 172 for the image capture device 132, and the latitudinal dimension 182 of the field-of-view 172 for the image capture device 132 may be oriented at 90° with respect to the longitudinal dimension 194 of the field-of-view 174 for the image capture device 134.

The image capture apparatus 110 shown in FIG. 1 may have 420° angular coverage in vertical and/or horizontal planes by the successive overlap of 90°, 120°, 90°, 120° respective fields-of-view 170, 172, 174 (not all shown) for four adjacent image capture devices 130, 132, 134 (not all shown). For example, fields-of-view 170, 172 for the image capture devices 130, 132 and fields-of-view (not shown) for two image capture devices (not shown) opposite the image capture devices 130, 132 respectively may be combined to provide 420° angular coverage in a horizontal plane. In some implementations, the overlap between fields-of-view of image capture devices 130, 132, 134 having a combined field-of-view including less than 360° angular coverage in a vertical and/or horizontal plane may be aligned and merged or combined to produce a panoramic image. For example, the image capture apparatus 110 may be in motion, such as rotating, and source images captured by at least one of the image capture devices 130, 132, 134 may be combined to form a panoramic image. As another example, the image capture apparatus 110 may be stationary, and source images captured contemporaneously by each image capture device 130, 132, 134 may be combined to form a panoramic image.

In some implementations, an image capture device 130, 132, 134 may include a lens 150, 152, 154 or other optical element. An optical element may include one or more lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. In some implementations, a lens 150, 152, 154 may be a fisheye lens and produce fisheye, or near-fisheye, field-of-view images. For example, the respective lenses 150, 152, 154 of the image capture devices 130, 132, 134 may be fisheye lenses. In some implementations, images captured by two or more image capture devices 130, 132, 134 of the image capture apparatus 110 may be combined by stitching or merging fisheye projections of the captured images to produce an equirectangular planar image. For example, a first fisheye image may be a round or elliptical image, and may be transformed to a first rectangular image, a second fisheye image may be a round or elliptical image, and may be transformed to a second rectangular image, and the first and second rectangular images may be arranged side-by-side, which may include overlapping, and stitched together to form the equirectangular planar image.

Although not expressly shown in FIG. 1, In some implementations, an image capture device 130, 132, 134 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIG. 1, in some implementations, an image capture apparatus 110 may include one or more microphones, which may receive, capture, and record audio information, which may be associated with images acquired by the image sensors.

Although not expressly shown in FIG. 1, the image capture apparatus 110 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

In some implementations, the image capture apparatus 110 may interface with or communicate with an external device, such as the external user interface (UI) device 120, via a wired (not shown) or wireless (as shown) computing communication link 160. Although a single computing communication link 160 is shown in FIG. 1 for simplicity, any number of computing communication links may be used. Although the computing communication link 160 shown in FIG. 1 is shown as a direct computing communication link, an indirect computing communication link, such as a link including another device or a network, such as the internet, may be used. In some implementations, the computing communication link 160 may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link 160 may be an HDMI link, a USB link, a digital video interface link, a display port interface link, such as a Video Electronics Standards Association (VESA) digital display interface link, an Ethernet link, a Thunderbolt link, and/or other wired computing communication link.

In some implementations, the user interface device 120 may be a computing device, such as a smartphone, a tablet computer, a phablet, a smart watch, a portable computer, and/or another device or combination of devices configured to receive user input, communicate information with the image capture apparatus 110 via the computing communication link 160, or receive user input and communicate information with the image capture apparatus 110 via the computing communication link 160.

In some implementations, the image capture apparatus 110 may transmit images, such as panoramic images, or portions thereof, to the user interface device 120 via the computing communication link 160, and the user interface device 120 may store, process, display, or a combination thereof the panoramic images.

In some implementations, the user interface device 120 may display, or otherwise present, content, such as images or video, acquired by the image capture apparatus 110. For example, a display of the user interface device 120 may be a viewport into the three-dimensional space represented by the panoramic images or video captured or created by the image capture apparatus 110.

In some implementations, the user interface device 120 may communicate information, such as metadata, to the image capture apparatus 110. For example, the user interface device 120 may send orientation information of the user interface device 120 with respect to a defined coordinate system to the image capture apparatus 110, such that the image capture apparatus 110 may determine an orientation of the user interface device 120 relative to the image capture apparatus 110. Based on the determined orientation, the image capture apparatus 110 may identify a portion of the panoramic images or video captured by the image capture apparatus 110 for the image capture apparatus 110 to send to the user interface device 120 for presentation as the viewport. In some implementations, based on the determined orientation, the image capture apparatus 110 may determine the location of the user interface device 120 and/or the dimensions for viewing of a portion of the panoramic images or video.

In an example, a user may rotate (sweep) the user interface device 120 through an arc or path 122 in space, as indicated by the arrow shown at 122 in FIG. 1. The user interface device 120 may communicate display orientation information to the image capture apparatus 110 using a communication interface such as the computing communication link 160. The image capture apparatus 110 may provide an encoded bitstream to enable viewing of a portion of the panoramic content corresponding to a portion of the environment of the display location as the image capture apparatus 110 traverses the path 122. Accordingly, display orientation information from the user interface device 120 may be transmitted to the image capture apparatus 110 to control user selectable viewing of captured images and/or video.

In some implementations, the image capture apparatus 110 may communicate with one or more other external devices (not shown) via wired or wireless computing communication links (not shown).

In some implementations, data, such as image data, audio data, and/or other data, obtained by the image capture apparatus 110 may be incorporated into a combined multimedia stream. For example, the multimedia stream may include a video track and/or an audio track. As another example, information from various metadata sensors and/or sources within and/or coupled to the image capture apparatus 110 may be processed to produce a metadata track associated with the video and/or audio track. The metadata track may include metadata, such as white balance metadata, image sensor gain metadata, sensor temperature metadata, exposure time metadata, lens aperture metadata, bracketing configuration metadata and/or other parameters. In some implementations, a multiplexed stream may be generated to incorporate a video and/or audio track and one or more metadata tracks.

In some implementations, the user interface device 120 may implement or execute one or more applications, such as GoPro Studio, GoPro App, or both, to manage or control the image capture apparatus 110. For example, the user interface device 120 may include an application for controlling camera configuration, video acquisition, video display, or any other configurable or controllable aspect of the image capture apparatus 110.

In some implementations, the user interface device 120, such as via an application (e.g., GoPro App), may generate and share, such as via a cloud-based or social media service, one or more images, or short video clips, such as in response to user input.

In some implementations, the user interface device 120, such as via an application (e.g., GoPro App), may remotely control the image capture apparatus 110, such as in response to user input.

In some implementations, the user interface device 120, such as via an application (e.g., GoPro App), may display unprocessed or minimally processed images or video captured by the image capture apparatus 110 contemporaneously with capturing the images or video by the image capture apparatus 110, such as for shot framing, which may be referred to herein as a live preview, and which may be performed in response to user input.

In some implementations, the user interface device 120, such as via an application (e.g., GoPro App), may mark one or more key moments contemporaneously with capturing the images or video by the image capture apparatus 110, such as with a HiLight Tag, such as in response to user input.

In some implementations, the user interface device 120, such as via an application (e.g., GoPro App), may display, or otherwise present, marks or tags associated with images or video, such as HiLight Tags, such as in response to user input. For example, marks may be presented in a GoPro Camera Roll application for location review and/or playback of video highlights.

In some implementations, the user interface device 120, such as via an application (e.g., GoPro App), may wirelessly control camera software, hardware, or both. For example, the user interface device 120 may include a web-based graphical interface accessible by a user for selecting a live or previously recorded video stream from the image capture apparatus 110 for display on the user interface device 120.

In some implementations, the user interface device 120 may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture apparatus 110.

Figure 2:
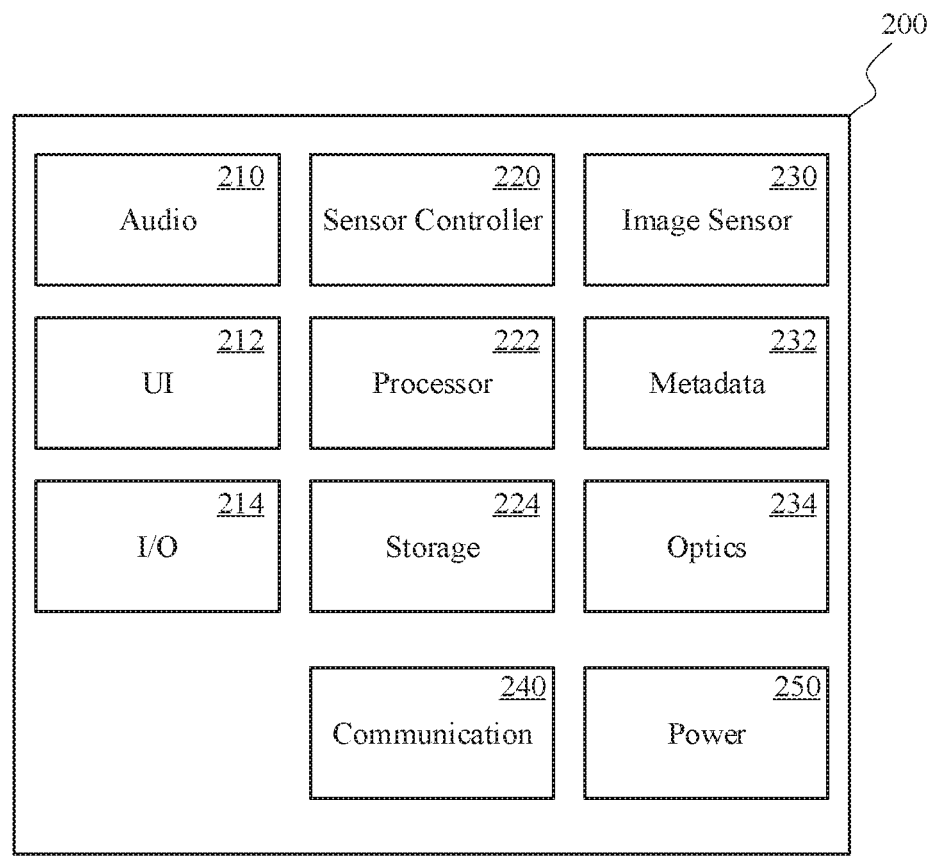
FIG. 2 is a block diagram of an example of an image capture device.

FIG. 2 is a block diagram of an example of an image capture device 200 in accordance with implementations of this disclosure. In some implementations, an image capture device 200, such as one of the image capture devices 130, 132, 134 shown in FIG. 1, which may be an action camera, may include an audio component 210, a user interface (UI) unit 212, an input/output (I/O) unit 214, a sensor controller 220, a processor 222, an electronic storage unit 224, an image sensor 230, a metadata unit 232, an optics unit 234, a communication unit 240, a power system 250, or a combination thereof.

In some implementations, the audio component 210, which may include a microphone, may receive, sample, capture, record, or a combination thereof audio information, such as sound waves, which may be associated with, such as stored in association with, image or video content contemporaneously captured by the image capture device 200. In some implementations, audio information may be encoded using, e.g., Advanced Audio Coding (AAC), Audio Compression-3 (AC3), Moving Picture Experts Group Layer-3 Audio (MP3), linear Pulse Code Modulation (PCM), Motion Picture Experts Group—High efficiency coding and media delivery in heterogeneous environments (MPEG-H), and/or other audio coding formats (audio codecs). In one or more implementations of spherical video and/or audio, the audio codec may include a three-dimensional audio codec, such as Ambisonics. For example, an Ambisonics codec can produce full surround audio including a height dimension. Using a G-format Ambisonics codec, a special decoder may be omitted.

In some implementations, the user interface unit 212 may include one or more units that may register or receive input from and/or present outputs to a user, such as a display, a touch interface, a proximity sensitive interface, a light receiving/emitting unit, a sound receiving/emitting unit, a wired/wireless unit, and/or other units. In some implementations, the user interface unit 212 may include a display, one or more tactile elements (e.g., buttons and/or virtual touch screen buttons), lights (LEDs), speakers, and/or other user interface elements. The user interface unit 212 may receive user input and/or provide information to a user related to the operation of the image capture device 200.

In some implementations, the user interface unit 212 may include a display unit that presents information related to camera control or use, such as operation mode information (e.g., image resolution, frame rate, capture mode, sensor mode, video mode, photo mode), connection status information (e.g., connected, wireless, wired connection), power mode information (e.g., standby mode, sensor mode, video mode), information related to other information sources (e.g., heart rate, GPS), and/or other information.

In some implementations, the user interface unit 212 may include a user interface component such as one or more buttons, which may be operated, such as by a user, to control camera operations, such as to start, stop, pause, and/or resume sensor and/or content capture. The camera control associated with respective user interface operations may be defined. For example, the camera control associated with respective user interface operations may be defined based on the duration of a button press (pulse width modulation), a number of button presses (pulse code modulation), or a combination thereof. In an example, a sensor acquisition mode may be initiated in response to detecting two short button presses. In another example, the initiation of a video mode and cessation of a photo mode, or the initiation of a photo mode and cessation of a video mode, may be triggered (toggled) in response to a single short button press. In another example, video or photo capture for a given time duration or a number of frames (burst capture) may be triggered in response to a single short button press. Other user command or communication implementations may also be implemented, such as one or more short or long button presses.

In some implementations, the I/O unit 214 may synchronize the image capture device 200 with other cameras and/or with other external devices, such as a remote control, a second image capture device, a smartphone, a user interface device, such as the user interface device 120 shown in FIG. 1, and/or a video server. The I/O unit 214 may communicate information between I/O components. In some implementations, the I/O unit 214 may be connected to the communication unit 240 to provide a wired and/or wireless communications interface (e.g., Wi-Fi, Bluetooth, USB, HDMI, Wireless USB, Near Field Communication (NFC), Ethernet, a radio frequency transceiver, and/or other interfaces) for communication with one or more external devices, such as a user interface device, such as the user interface device 120 shown in FIG. 1, or another metadata source. In some implementations, the I/O unit 214 may interface with LED lights, a display, a button, a microphone, speakers, and/or other I/O components. In some implementations, the I/O unit 214 may interface with an energy source, e.g., a battery, and/or a Direct Current (DC) electrical source.

In some implementations, the I/O unit 214 of the image capture device 200 may include one or more connections to external computerized devices for configuration and/or management of remote devices, as described herein. The I/O unit 214 may include any of the wireless or wireline interfaces described herein, and/or may include customized or proprietary connections for specific applications.

In some implementations, the sensor controller 220 may operate or control the image sensor 230, such as in response to input, such as user input. In some implementations, the sensor controller 220 may receive image and/or video input from the image sensor 230 and may receive audio information from the audio component 210.

In some implementations, the processor 222 may include a system on a chip (SOC), microcontroller, microprocessor, CPU, DSP, application-specific integrated circuit (ASIC), GPU, and/or other processor that may control the operation and functionality of the image capture device 200. In some implementations, the processor 222 may interface with the sensor controller 220 to obtain and process sensory information for, e.g., object detection, face tracking, stereo vision, and/or other image processing.

In some implementations, the sensor controller 220, the processor 222, or both may synchronize information received by the image capture device 200. For example, timing information may be associated with received sensor data, and metadata information may be related to content (photo/video) captured by the image sensor 230 based on the timing information. In some implementations, the metadata capture may be decoupled from video/image capture. For example, metadata may be stored before, after, and in-between the capture, processing, or storage of one or more video clips and/or images.

In some implementations, the sensor controller 220, the processor 222, or both may evaluate or process received metadata and may generate other metadata information. For example, the sensor controller 220 may integrate the received acceleration information to determine a velocity profile for the image capture device 200 concurrent with recording a video. In some implementations, video information may include multiple frames of pixels and may be encoded using an encoding method (e.g., H.265, H.264, CineForm, and/or other codec).

Although not shown separately in FIG. 2, one or more of the audio component 210, the user interface unit 212, the I/O unit 214, the sensor controller 220, the processor 222, the electronic storage unit 224, the image sensor 230, the metadata unit 232, the optics unit 234, the communication unit 240, or the power systems 250 of the image capture device 200 may communicate information, power, or both with one or more other units, such as via an electronic communication pathway, such as a system bus. For example, the processor 222 may interface with the audio component 210, the user interface unit 212, the I/O unit 214, the sensor controller 220, the electronic storage unit 224, the image sensor 230, the metadata unit 232, the optics unit 234, the communication unit 240, or the power systems 250 via one or more driver interfaces and/or software abstraction layers. In some implementations, one or more of the units shown in FIG. 2 may include a dedicated processing unit, memory unit, or both (not shown). In some implementations, one or more components may be operable by one or more other control processes. For example, a GPS receiver may include a processing apparatus that may provide position and/or motion information to the processor 222 in accordance with a defined schedule (e.g., values of latitude, longitude, and elevation at 10 Hz).

In some implementations, the electronic storage unit 224 may include a system memory module that may store executable computer instructions that, when executed by the processor 222, perform various functionalities including those described herein. For example, the electronic storage unit 224 may be a non-transitory computer-readable storage medium, which may include executable instructions, and a processor, such as the processor 222 may execute the instruction to perform one or more, or portions of one or more, of the operations described herein. The electronic storage unit 224 may include storage memory for storing content (e.g., metadata, images, audio) captured by the image capture device 200.

In some implementations, the electronic storage unit 224 may include non-transitory memory for storing configuration information and/or processing code for video information and metadata capture, and/or to produce a multimedia stream that may include video information and metadata in accordance with the present disclosure. In some implementations, the configuration information may include capture type (video, still images), image resolution, frame rate, burst setting, white balance, recording configuration (e.g., loop mode), audio track configuration, and/or other parameters that may be associated with audio, video, and/or metadata capture. In some implementations, the electronic storage unit 224 may include memory that may be used by other hardware/firmware/software elements of the image capture device 200.

In some implementations, the image sensor 230 may include one or more of a charge-coupled device sensor, an active pixel sensor, a complementary metal-oxide semiconductor sensor, an N-type metal-oxide-semiconductor sensor, and/or another image sensor or combination of image sensors. In some implementations, the image sensor 230 may be controlled based on control signals from a sensor controller 220.

The image sensor 230 may sense or sample light waves gathered by the optics unit 234 and may produce image data or signals. The image sensor 230 may generate an output signal conveying visual information regarding the objects or other content corresponding to the light waves received by the optics unit 234. The visual information may include one or more of an image, a video, and/or other visual information.

In some implementations, the image sensor 230 may include a video sensor, an acoustic sensor, a capacitive sensor, a radio sensor, a vibrational sensor, an ultrasonic sensor, an infrared sensor, a radar sensor, a Light Detection And Ranging (LIDAR) sensor, a sonar sensor, or any other sensory unit or combination of sensory units capable of detecting or determining information in a computing environment.

In some implementations, the metadata unit 232 may include sensors such as an IMU, which may include one or more accelerometers and/or gyroscopes, a magnetometer, a compass, a GPS sensor, an altimeter, an ambient light sensor, a temperature sensor, and/or other sensors or combinations of sensors. In some implementations, the image capture device 200 may contain one or more other metadata/telemetry sources, e.g., image sensor parameters, battery monitor, storage parameters, and/or other information related to camera operation and/or capture of content. The metadata unit 232 may obtain information related to the environment of the image capture device 200 and aspects in which the content is captured.

For example, the metadata unit 232 may include an accelerometer that may provide device motion information including velocity and/or acceleration vectors representative of motion of the image capture device 200. In another example, the metadata unit 232 may include a gyroscope that may provide orientation information describing the orientation of the image capture device 200. In another example, the metadata unit 232 may include a GPS sensor that may provide GPS coordinates, time, and information identifying a location of the image capture device 200. In another example, the metadata unit 232 may include an altimeter that may obtain information indicating an altitude of the image capture device 200.

In some implementations, the metadata unit 232, or one or more portions thereof, may be rigidly coupled to the image capture device 200 such that motion, changes in orientation, or changes in the location of the image capture device 200 may be accurately detected by the metadata unit 232. Although shown as a single unit, the metadata unit 232, or one or more portions thereof, may be implemented as multiple distinct units. For example, the metadata unit 232 may include a temperature sensor as a first physical unit and a GPS unit as a second physical unit. In some implementations, the metadata unit 232, or one or more portions thereof, may be included in an image capture device 200 as shown, or may be included in a physically separate unit operatively coupled to, such as in communication with, the image capture device 200.

In some implementations, the optics unit 234 may include one or more of a lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations, the optics unit 234 may include a focus controller unit that may control the operation and configuration of the camera lens. The optics unit 234 may receive light from an object and may focus received light onto an image sensor 230. Although not shown separately in FIG. 2, in some implementations, the optics unit 234 and the image sensor 230 may be combined, such as in a combined physical unit, such as a housing.

In some implementations, the communication unit 240 may be coupled to the I/O unit 214 and may include a component (e.g., a dongle) having an infrared sensor, a radio frequency transceiver and antenna, an ultrasonic transducer, and/or other communications interfaces used to send and receive wireless communication signals. In some implementations, the communication unit 240 may include a local (e.g., Bluetooth, Wi-Fi) and/or broad range (e.g., cellular LTE) communications interface for communication between the image capture device 200 and a remote device (e.g., the user interface device 120 in FIG. 1). The communication unit 240 may communicate using, for example, Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. In some implementations, the communication unit 240 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged via the communication unit 240 may be represented using formats including one or more of hypertext markup language (HTML), extensible markup language (XML), and/or other formats. One or more exchanges of information between the image capture device 200 and remote or external devices may be encrypted using encryption technologies including one or more of secure sockets layer (SSL), transport layer security (TLS), virtual private networks (VPNs), Internet Protocol security (IPsec), and/or other encryption technologies.

In some implementations, the one or more power systems 250 supply power to the image capture device 200. For example, for a small-sized, lower-power action camera a wireless power solution (e.g., battery, solar cell, inductive (contactless) power source, rectification, and/or other power supply) may be used.

Consistent with the present disclosure, the components of the image capture device 200 may be remote from one another and/or aggregated. For example, one or more sensor components may be distal from the image capture device 200, e.g., such as shown and described with respect to FIG. 1. Multiple mechanical, sensory, or electrical units may be controlled by a learning apparatus via network/radio connectivity.

Figure 3:
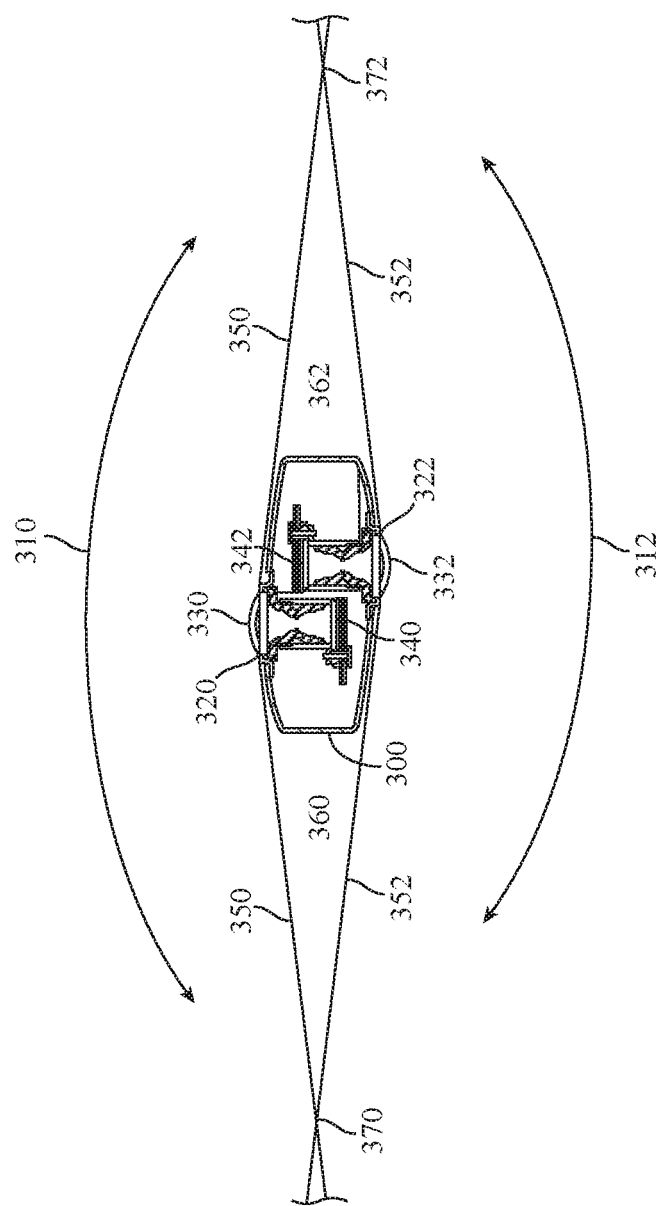
FIG. 3 is a cross-sectional view of an example of an image capture apparatus including overlapping fields-of-view.

FIG. 3 is a cross-sectional view of an example of a dual-lens image capture apparatus 300 including overlapping fields-of-view 310, 312 in accordance with implementations of this disclosure. In some implementations, the image capture apparatus 300 may be a spherical image capture apparatus with fields-of-view 310, 312 as shown in FIG. 3. For example, the image capture apparatus 300 may include image capture devices 320, 322, related components, or a combination thereof, arranged in a back-to-back or Janus configuration. For example, a first image capture device 320 may include a first lens 330 and a first image sensor 340, and a second image capture device 322 may include a second lens 332 and a second image sensor 342 arranged oppositely from the first lens 330 and the first image sensor 340.

The first lens 330 of the image capture apparatus 300 may have the field-of-view 310 shown above a boundary 350. Behind the first lens 330, the first image sensor 340 may capture a first hyper-hemispherical image plane from light entering the first lens 330, corresponding to the first field-of-view 310.

The second lens 332 of the image capture apparatus 300 may have a field-of-view 312 as shown below a boundary 352. Behind the second lens 332, the second image sensor 342 may capture a second hyper-hemispherical image plane from light entering the second lens 332, corresponding to the second field-of-view 312.

In some implementations, one or more areas, such as blind spots 360, 362, may be outside of the fields-of-view 310, 312 of the lenses 330, 332, light may be obscured from the lenses 330, 332 and the respective image sensors 340, 342, and content in the blind spots 360, 362 may be omitted from capture. In some implementations, the image capture apparatus 300 may be configured to minimize the blind spots 360, 362.

In some implementations, the fields-of-view 310, 312 may overlap. Stitch points 370, 372, proximal to the image capture apparatus 300, at which the fields-of-view 310, 312 overlap may be referred to herein as overlap points or stitch points. Content captured by the respective lenses 330, 332, distal to the stitch points 370, 372, may overlap.

In some implementations, images contemporaneously captured by the respective image sensors 340, 342 may be combined to form a combined image. Combining the respective images may include correlating the overlapping regions captured by the respective image sensors 340, 342, aligning the captured fields-of-view 310, 312, and stitching the images together to form a cohesive combined image.

In some implementations, a small change in the alignment (e.g., position and/or tilt) of the lenses 330, 332, the image sensors 340, 342, or both may change the relative positions of their respective fields-of-view 310, 312 and the locations of the stitch points 370, 372. A change in alignment may affect the size of the blind spots 360, 362, which may include changing the size of the blind spots 360, 362 unequally.

In some implementations, incomplete or inaccurate information indicating the alignment of the image capture devices 320, 322, such as the locations of the stitch points 370, 372, may decrease the accuracy, efficiency, or both of generating a combined image. In some implementations, the image capture apparatus 300 may maintain information indicating the location and orientation of the lenses 330, 332 and the image sensors 340, 342 such that the fields-of-view 310, 312, stitch points 370, 372, or both may be accurately determined, which may improve the accuracy, efficiency, or both of generating a combined image.

In some implementations, optical axes through the lenses 330, 332 may be substantially antiparallel to each other, such that the respective axes may be within a tolerance such as 1%, 3%, 5%, 10%, and/or other tolerances. In some implementations, the image sensors 340, 342 may be substantially perpendicular to the optical axes through their respective lenses 330, 332, such that the image sensors may be perpendicular to the respective axes to within a tolerance such as 1%, 3%, 5%, 10%, and/or other tolerances.

In some implementations, the lenses 330, 332 may be laterally offset from each other, may be off-center from a central axis of the image capture apparatus 300, or may be laterally offset and off-center from the central axis. As compared to an image capture apparatus with back-to-back lenses (e.g., lenses aligned along the same axis), the image capture apparatus 300 including laterally offset lenses 330, 332 may include substantially reduced thickness relative to the lengths of the lens barrels securing the lenses 330, 332. For example, the overall thickness of the image capture apparatus 300 may be close to the length of a single lens barrel as opposed to twice the length of a single lens barrel as in a back-to-back configuration. Reducing the lateral distance between the lenses 330, 332 may improve the overlap in the fields-of-view 310, 312.

In some implementations, images or frames captured by an image capture apparatus, such as the image capture apparatus 110 shown in FIG. 1 or the image capture apparatus 300 shown in FIG. 3, may be combined, merged, or stitched together, to produce a combined image, such as a spherical or panoramic image, which may be an equirectangular planar image. In some implementations, generating a combined image may include three-dimensional, or spatiotemporal, noise reduction (3DNR). In some implementations, pixels along the stitching boundary may be matched accurately to minimize boundary discontinuities.

Figure 4A:
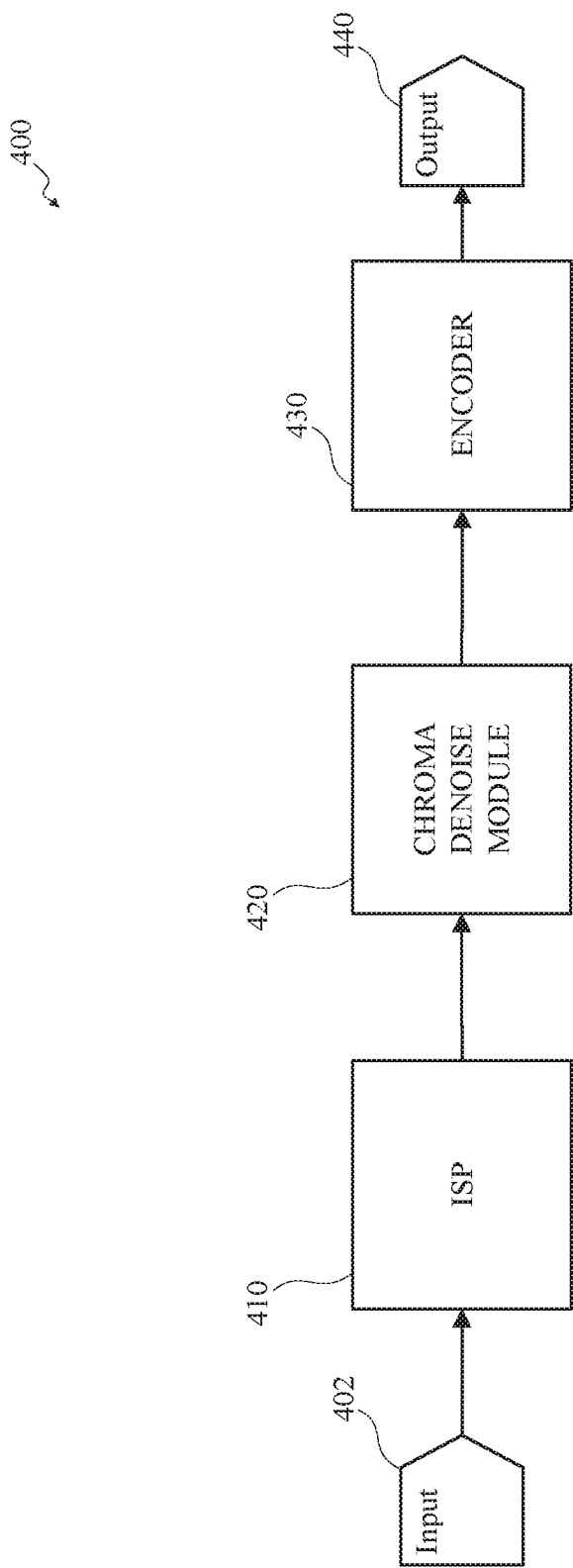
FIG. 4A is a block diagram of an example of an image processing and coding pipeline.

FIG. 4A is a block diagram of an example of an image processing and coding pipeline 400. The image processing and coding pipeline 400 includes an image signal processor (ISP) 410, a chroma denoise module 420, and an encoder 430 that are configured to process captured images (e.g., still images or frames of video) to produce encoded images. In some implementations, the image processing and coding pipeline 400 may be included in an image capture device, such as the image capture device 200 shown in FIG. 2, or an image capture apparatus, such as the image capture apparatus 110 shown in FIG. 1 or the image capture apparatus 300 shown in FIG. 3.

The image signal processor 410 may receive an input image signal 402. For example, an image sensor (not shown), such as image sensor 230 shown in FIG. 2, may capture an image, or a portion thereof, and may send, or transmit, the captured image, or image portion, to the image signal processor 410 as the input image signal 402. For example, the input image signal 402 may include a sequence or series of frames of a video, which may be captured at a rate, or frame rate, which may be a number or cardinality of frames captured per defined temporal period, such as 24, 30, or 60 frames per second. The image signal processor 410 may receive the input image signal 402, process the input image signal 402, and output a processed image. Processing the input image signal 402 may include generating and using the local motion estimation information, spatiotemporal noise reduction (3DNR), dynamic range enhancement, local tone adjustment, exposure adjustment, contrast adjustment, image stitching, and/or other operations. For example, the image signal processor 410 may be the image signal processor 500 of FIG. 5.

The image processing and coding pipeline 400 includes a chroma denoise module 420 that is configured to receive an image from the image signal processor 410, determine a denoised image based on the image, and output the denoised image, which, in turn, is input to the encoder 430. The chroma denoise module 420 determines the denoised image by determining a set of weights (e.g., a set of non-local means weights) based on a luminance channel of the image and applying the set of weights to one or more chrominance channels of the image. In some implementations, the set of weights are determined based on the luminance channel and chrominance channels of the image. In some implementations, the set of weights are applied iteratively to the chrominance channel(s) of the image. For example, the chroma denoise module 420 may include the non-local means noise reduction module 700 of FIG. 7. For example, the chroma denoise module 420 may implement the process 800 of FIG. 8 or the process 900 of FIG. 9. The chroma denoise module 420 may reduce noise levels in chrominance channels of the images from the image signal processor 410 with little blurring distortion.

The encoder 430 may encode (e.g., compress) the denoised images output from chroma denoise module 420. The encoder 430 may implement the one or more encoding standards (e.g., MPEG, VP9, H.265, or JPEG) to encode video or still images. For example, the encoder 430 may output encoded video as an encoded output 440. For example, the encoder 430 may encode the denoised images as still images and may output the encoded images as the encoded output 440.

Figure 4B:
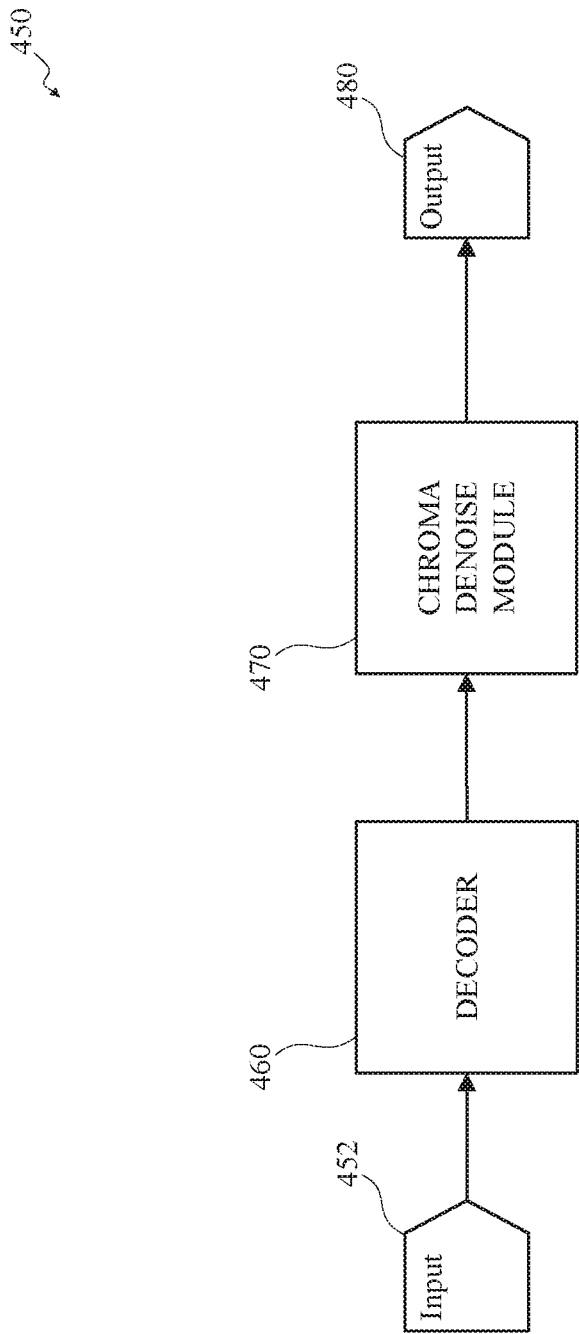
FIG. 4B is a block diagram of an example of a receiving station image processing pipeline that is configured to decode encoded images that it receives.

FIG. 4B is a block diagram of an example of a receiving station image processing pipeline 450 that is configured to decode encoded images that it receives. The receiving station image processing pipeline 450 includes a decoder 460 and a chroma denoise module 470 that are configured to process received encoded images (e.g., still images or frames of video) to produce decoded images that are output 480 for display or storage. In some implementations, the receiving station image processing pipeline 450 may receive an encoded bitstream (e.g., a file) as input 452 from an image capture device, such as the image capture device 200 shown in FIG. 2, or an image capture apparatus, such as the image capture apparatus 110 shown in FIG. 1 or the image capture apparatus 300 shown in FIG. 3.

The decoder 460 may decode (e.g., decompress) images (e.g., still images or frames of video) from the input 452 to obtain decoded images, which may in turn be passed to the chroma denoise module 470. The decoder 460 may implement the one or more coding standards (e.g., MPEG, VP9, H.265, or JPEG) to decode video or still images. For example, the decoder 460 may output decoded video frames as a sequence of decoded images. For example, the decoder 460 may output decoded still images.

The receiving station image processing pipeline 450 includes a chroma denoise module 470 that is configured to receive a decoded image from the decoder 460, determine a denoised image based on the decoded image, and output the denoised image as output 480. The chroma denoise module 470 determines the denoised image by determining a set of weights (e.g., a set of non-local means weights) based on a luminance channel of the decoded image and applying the set of weights to one or more chrominance channels of the decoded image. In some implementations, the set of weights are determined based on the luminance channel and chrominance channels of the decoded image. In some implementations, the set of weights are applied iteratively to the chrominance channel(s) of the decoded image. For example, the chroma denoise module 470 may include the non-local means noise reduction module 700 of FIG. 7. For example, the chroma denoise module 470 may implement the process 800 of FIG. 8 or the process 900 of FIG. 9. The chroma denoise module 470 may reduce noise levels in chrominance channels of the decoded images with little blurring distortion.

Figure 5:
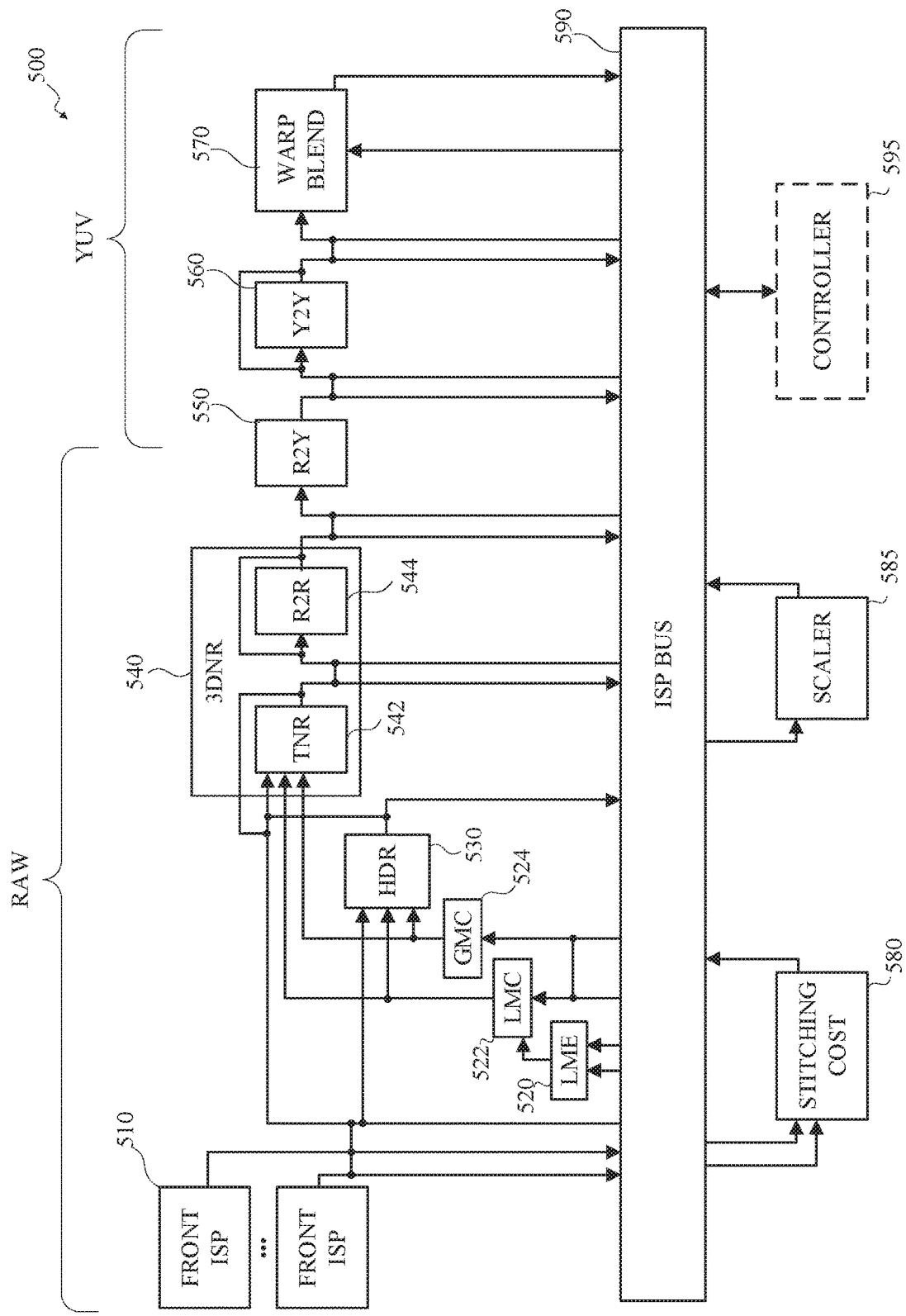
FIG. 5 is a functional block diagram of an example of an image signal processor.

FIG. 5 is a functional block diagram of an example of an image signal processor 500. An image signal processor 500 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image signal processor 500 may be similar to the image signal processor 410 shown in FIG. 4.

The image signal processor 500 may receive an image signal, such as from an image sensor (not shown), such as the image sensor 230 shown in FIG. 2, in a defined format, such as a format of the image sensor, which may be referred to herein as "raw," such as "a raw image," "raw image data," "raw data," "a raw signal," or "a raw image signal." For example, the raw image signal may be in a format such as RGB format, which may represent individual pixels using a combination of values or components, such as a red component (R), a green component (G), and a blue component (B). In some implementations, the image signal processor 500 may convert the raw image data (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

The image signal processor 500 may include a front image signal processor (Front ISP) 510, or multiple front image signal processors as shown, a local motion estimation (LME) unit 520, a local motion compensation (LMC) unit 522, a global motion compensation (GMC) unit 524, a high dynamic range (HDR) unit 530, a three-dimensional noise reduction (3DNR) unit 540, which may include a temporal noise reduction (TNR) unit 542 and a raw to raw (R2R) unit 544, a raw to YUV (R2Y) unit 550, a YUV to YUV (Y2Y) unit 560, a warp and blend unit 570, a stitching cost unit 580, a scaler 585, an image signal processor bus (ISP BUS) 590, a configuration controller 595, or a combination thereof.

Although not shown expressly in FIG. 5, in some implementations, one or more of the front image signal processor 510, the local motion estimation unit 520, the local motion compensation unit 522, the global motion compensation unit 524, the high dynamic range unit 530, the three-dimensional noise reduction unit 540, the temporal noise reduction unit 542, the raw to raw unit 544, the raw to YUV unit 550, the YUV to YUV unit 560, the warp and blend unit 570, the stitching cost unit 580, the scaler 585, the image signal processor bus 590, the configuration controller 595, or any combination thereof, may include a respective clock, power domain, or both.

In some implementations, the front image signal processor 510 may minimally process image signals received from respective image sensors, which may include image scaling. Scaling, by the front image signal processor 510, may include processing pixels, such as a defined cardinality of pixels, corresponding to a determined quality. For example, the front image signal processor 510 may correct dead pixels, perform band processing, decouple vertical blanking, or a combination thereof. In some implementations, the front image signal processor 510 may output a high resolution frame, one or more downscaled, or reduced, resolution frames, such as a ½×½ resolution frame, a ¼×¼ resolution frame, a ⅛×⅛ resolution frame, a 1/16×1/16 resolution frame, a 1/32×1/32 resolution frame, or any combination thereof.

In some implementations, a multiple camera apparatus, such as the image capture apparatus 110 shown in FIG. 1, may include multiple image capture devices, such as the image capture device 200 shown in FIG. 2, and may include a respective front image signal processor 510 associated with each image capture device.

The local motion estimation unit 520 may receive a target image (e.g., a target frame of video) and a reference image (e.g., a reference frame of video) and determine motion information (e.g., a set of motion vectors) that may be used to determine a transformation that may be applied to the reference image to better align image portions (e.g., pixels or blocks of pixels) of the reference image with corresponding image portions of the target image.

The local motion estimation unit 520 may receive, or otherwise access, a target image, or one or more portions thereof, which may be a current input frame, such as via the image signal processor bus 590. In some implementations, the local motion estimation unit 520 may receive the target image, at a downscaled, or reduced, resolution. In some implementations, such as implementations implementing high dynamic range image processing, the target image may be a long exposure input frame.

The local motion estimation unit 520 may receive, or otherwise access, a reference image, or one or more portions thereof, such as via the image signal processor bus 590. In some implementations, such as implementations including temporal noise reduction, the reference image may be a recirculated frame that has been generated based on one or more previous frames of video from an image sensor. For example, the reference image may be a recirculated frame from the three-dimensional noise reduction unit 540. In some implementations, such as implementations including high dynamic range image processing, the reference image may be a short exposure input frame corresponding to the long exposure input frame that will be combined with the long exposure input frame to obtain a high dynamic range frame.

In some implementations, the local motion estimation unit 520 may receive, or otherwise access, previously generated motion information, such as previously generated motion vectors for the target image or motion information for a previously processed frame.

The local motion estimation unit 520 may determine motion information, such as motion vectors, representing motion between the reference image and the target image, such as motion caused by moving objects in the field-of-view or non-rotational motion, or translation, of the field-of-view. The local motion estimation unit 520 may output the motion information. For example, the local motion estimation unit 520 may output motion vectors to the local motion compensation unit 522.

The local motion compensation unit 522 may receive, or otherwise access, a reference image, or one or more portions thereof, such as via the image signal processor bus 590. In some implementations, such as implementations implementing temporal noise reduction processing, the reference image may be a recirculated frame (e.g., from the three-dimensional noise reduction unit 540). In some implementations, such as implementations implementing high dynamic range image processing, the reference image may be the short exposure input frame, where a corresponding long exposure frame has been used as the target image. In some implementations, such as implementations implementing high dynamic range image processing, the reference image may be a long exposure input frame, where a corresponding short exposure frame has been used as the target image.

The local motion compensation unit 522 may receive, or otherwise access, motion information, such as motion vectors, associated with the reference image. For example, the local motion compensation unit 522 may receive the motion vectors from the local motion estimation unit 520.

The local motion compensation unit 522 may generate or obtain a prediction image (e.g., a prediction frame), or a portion thereof, such as a prediction block, which may be a prediction of the target image, or a portion thereof, such as a target block of the target image, based on the reference image, or a portion thereof, and the local motion information. For example, a prediction image may be obtained by applying a transformation, which is based on the local motion information, to the reference image (e.g., a recirculated frame or a short exposure frame). The local motion compensation unit 522 may output a local motion prediction image, or one or more portions thereof, which may be referred to herein as a local motion compensated image (e.g., a local motion compensated frame of video).

The global motion compensation unit 524 may receive, or otherwise access, the reference image, or one or more portions thereof, such as via the image signal processor bus 590. In some implementations, such as implementations implementing temporal noise reduction processing, the reference image may be a recirculated frame (e.g., from the three-dimensional noise reduction unit 540). In some implementations, such as implementations implementing high dynamic range image processing, the reference image may be a short exposure input frame, where a corresponding long exposure input frame has been used as the target image. In some implementations, such as implementations implementing high dynamic range image processing, the reference image may be a long exposure input frame, where a corresponding short exposure input frame has been used as the target image.

The global motion compensation unit 524 may receive, or otherwise access, global motion information, such as global motion information from a gyroscopic unit of the image capture apparatus, such as a gyroscopic sensor included in the metadata unit 232 shown in FIG. 2, corresponding to a time period between capture of the reference image and capture of the target image. The global motion information may indicate a non-translational change in the orientation of the field-of-view relative to the content captured in respective images. For example, the global motion information may indicate a horizontal change of the field-of-view, which may indicate that the corresponding camera panned, or rotated, around a vertical axis. In another example, the global motion information may indicate a vertical change of the field-of-view, which may indicate that the camera tilted or rotated around an axis perpendicular to the lens. In another example, the global motion information may indicate a rotational change of the field-of-view relative to the horizon, which may indicate that the camera rolled or rotated around an axis parallel to the lens. The global motion information may be distinct from motion information, such as translation motion information, indicating a change in the geospatial location of the image capture apparatus, which may include a change associated with changing an elevation of the image capture apparatus.

The global motion compensation unit 524 may generate or obtain a prediction image (e.g., a prediction frame of video), or a portion thereof, such as a prediction block, which may be a prediction of the target image, or a portion thereof, such as a target block of the target image, based on the reference image, or a portion thereof, and the global motion information. For example, a prediction image may be obtained by applying a transformation, which is based on the global motion information, to the reference image (e.g., a recirculated frame or a short exposure frame). The global motion compensation unit 524 may output a global motion prediction image, or one or more portions thereof, which may be referred to herein as a global motion compensated image (e.g., a global motion compensated frame of video).

The high dynamic range unit 530 may receive, or otherwise access, (e.g., from the front image signal processor 510) multiple images of a scene that have been captured with different exposure times. The high dynamic range unit 530 may combine the images captured with different exposure times to obtain a high dynamic range image. For example, the high dynamic range unit 530 may combine two images, a long exposure image and a short exposure image, to obtain a high dynamic range image. For example, image portions (e.g., pixels or blocks of pixels) of the high dynamic range image may be determined based on corresponding image portions the short exposure image where the respective image portions of the long exposure image have saturated pixel values and may otherwise determine image portions of the high dynamic range based on corresponding image portions the long exposure image. In some implementations, motion compensation (e.g., local motion compensation by the local motion compensation unit 522 and/or global motion compensation by the global motion compensation unit 524) may be applied to either the long exposure image or the short exposure image to better align pixels corresponding to objects appearing in the field of view of the two input images. For example, the high dynamic range unit 530 may combine a long exposure image with a motion compensated short exposure image. For example, the high dynamic range unit 530 may combine a short exposure image with a motion compensated long exposure image. The high dynamic range unit 530 may receive, or otherwise access, the local motion prediction image, or a portion thereof, from the local motion compensation unit 522. The high dynamic range unit 530 may receive, or otherwise access, the global motion prediction image, or a portion thereof, from the global motion compensation unit 524.

The high dynamic range unit 530 may output the high dynamic range image. For example, the high dynamic range unit 530 may output the high dynamic range image by storing the high dynamic range image in memory, such as shared memory, via the image signal processor bus 590, or the high dynamic range unit 530 may output the high dynamic range image directly to another unit of the image signal processor 500, such as the temporal noise reduction unit 542.

In some implementations, the high dynamic range unit 530 may be omitted, or high dynamic range processing by the high dynamic range unit 530 may be omitted.

The three-dimensional noise reduction unit 540 may include the temporal noise reduction (TNR) unit 542, the raw to raw (R2R) unit 544, or both.

The temporal noise reduction unit 542 may receive the current input frame, or one or more portions thereof, such as from the front image signal processor 510 or via the image signal processor bus 590. In some implementations, such as implementations implementing high dynamic range image processing, the temporal noise reduction unit 542 may receive the high dynamic range input frame, or one or more portions thereof, such as from the high dynamic range unit 530, as the current input frame.

The temporal noise reduction unit 542 may receive, or otherwise access, a local motion prediction frame from the local motion compensation unit 522. The temporal noise reduction unit 542 may receive, or otherwise access, the global motion prediction frame from the global motion compensation unit 524.

The temporal noise reduction unit 542 may reduce temporal noise in the current input frame, which may include recursively reducing temporal noise in a sequence of input images, such as a video. Recursive temporal noise reduction may include combining a current image from a sequence of images (e.g., a current frame from a video) with a recirculated image that is based on one or more previous images from the sequence of images to obtain a noise reduced image. Details of this combination (e.g., mixing weights for respective image portions) may be determined based on noise level information (e.g., a noise map) for the recirculated image.

The temporal noise reduction unit 542 may generate output including a pixel value and associated noise variance for the pixel value for one or more pixels of the noise reduced image (e.g., the noise reduced frame).

The raw to raw unit 544 may perform spatial denoising of frames of raw images (e.g., frames of video). In some implementations, the raw to raw unit 544 may implement non-local means processing to reduce noise of a frame by determining weighted averages of pixels within the frame, where the weights depend on the similarity of the intensity or color between pixels. In some implementations, the weights may be based on noise variance values received from the temporal noise reduction unit 542. In some implementations, noise variance values for pixels of an image may be updated based on weights (e.g., non-local means weights) used to combine pixels of the image for spatial denoising, and these updated noise variance values may be recirculated. Spatial denoising (e.g., non-local means denoising) in the raw to raw unit 544 may include multiple passes of image signal processing, including passes at various resolutions.

The raw to YUV unit 550 may demosaic, and/or color process, the frames of raw images, which may include representing each pixel in the YUV format, which may include a combination of a luminance (Y) component and two chrominance (UV) components.

The YUV to YUV unit 560 may perform local tone mapping of YUV images. In some implementations, the YUV to YUV unit 560 may include multi-scale local tone mapping using a single pass approach or a multi-pass approach on a frame at different scales. In some implementations, the YUV to YUV unit 560 is configured to perform denoising of one or more chrominance channels of YUV images. For example, the YUV to YUV unit 560 may include the non-local means noise reduction module 700 of FIG. 7. For example, the YUV to YUV unit 560 may implement the process 800 of FIG. 8 or the process 900 of FIG. 9.

The warp and blend unit 570 may warp images, blend images, or both. In some implementations, the warp and blend unit 570 may warp a corona around the equator of each frame to a rectangle. For example, the warp and blend unit 570 may warp a corona around the equator of each frame to a rectangle based on the corresponding low resolution frame generated by the front image signal processor 510.

The warp and blend unit 570 may apply one or more transformations to the frames. In some implementations, spherical images produced by a multi-face camera device, such as the image capture apparatus 110 shown in FIG. 1 or the image capture apparatus 300 shown in FIG. 3, may be warped and/or blended by the warp and blend unit 570 to correct for distortions at image edges. In some implementations, the warp and blend unit 570 may apply a transformation that is subject to a close to identity constraint, wherein a location of a pixel in an input image to the warp and blend unit 570 may be similar to, such as within a defined distance threshold of, a location of a corresponding pixel in an output image from the warp and blend unit 570. For example, the warp and blend unit 570 may include an internal memory, which may have a size, such as 100 lines, which may be smaller than a size of a frame, and the warp and blend unit 570 may process the input image data in raster-in/raster-out order using a transformation that is subject to a close to identity constraint.

In some implementations, the warp and blend unit 570 may apply a transformation that is independent of close to identity constraints, which may include processing the input image data in raster-in/dynamic-out or dynamic-in/raster-out order. For example, the warp and blend unit 570 may transform two or more non-rectilinear (fisheye) images to generate a combined frame, such as an equirectangular frame, by processing the input image data in raster-in/dynamic-out or dynamic-in/raster-out order.

The stitching cost unit 580 may generate a stitching cost map as an output. In some implementations, the cost map may be represented as a rectangle having disparity x and longitude y based on a warping. Each value of the cost map may be a cost function of a disparity x value for a corresponding longitude. Cost maps may be generated for various scales, longitudes, and disparities.

The scaler 585 may scale images received from the output of the warp and blend unit 570, which may be in patches, or blocks, of pixels, such as 16×16 blocks, 8×8 blocks, or patches or blocks of any other size or combination of sizes.

The image signal processor bus 590 may be a bus or interconnect, such as an on-chip interconnect or embedded microcontroller bus interface, for communication between the front image signal processor 510, the temporal noise reduction unit 542, the local motion compensation unit 522, the raw to raw unit 544, the raw to YUV unit 550, the YUV to YUV unit 560, the combined warp and blend unit 570, the stitching cost unit 580, the scaler 585, the configuration controller 595, or any combination thereof.

The configuration controller 595 may coordinate image processing by the front image signal processor 510, the local motion estimation unit 520, the local motion compensation unit 522, the global motion compensation unit 524, the high dynamic range unit 530, the three-dimensional noise reduction unit 540, the temporal noise reduction unit 542, the raw to raw unit 544, the raw to YUV unit 550, the YUV to YUV unit 560, the warp and blend unit 570, the stitching cost unit 580, the scaler 585, the image signal processor bus 590, or any combination thereof, of the image signal processor 500. For example, the configuration controller 595 may control camera alignment model calibration, auto-exposure, auto-white balance, or any other camera calibration or similar process or combination of processes. In some implementations, the configuration controller 595 may be a microcontroller. The configuration controller 595 is shown in FIG. 5 using broken lines to indicate that the configuration controller 595 may be included in the image signal processor 500 or may be external to, and in communication with, the image signal processor 500. The configuration controller 595 may include a respective clock, power domain, or both.

FIG. 6A is a block diagram of an example of a system 600 configured for image capture and denoising of chrominance channels. The system 600 includes an image capture device 610 (e.g., a camera or a drone) that includes a processing apparatus 612 that is configured to receive a first image from a first image sensor 614 and receive a second image from a second image sensor 616. The processing apparatus 612 may be configured to perform image signal processing (e.g., denoising, stitching, and/or encoding) to generated composite images based on image data from the image sensors 614 and 616. The image capture device 610 includes a communications interface 618 for transferring images to other devices. The image capture device 610 includes a user interface 620, which may allow a user to control image capture functions and/or view images. The image capture device 610 includes a battery 622 for powering the image capture device 610. The components of the image capture device 610 may communicate with each other via a bus 624. The system 600 may be used to implement processes described in this disclosure, such as the process 800 of FIG. 8 and/or the process 900 of FIG. 9.

The processing apparatus 612 may include one or more processors having single or multiple processing cores. The processing apparatus 612 may include memory, such as random access memory device (RAM), flash memory, or any other suitable type of storage device such as a non-transitory computer readable memory. The memory of the processing apparatus 612 may include executable instructions and data that can be accessed by one or more processors of the processing apparatus 612. For example, the processing apparatus 612 may include one or more DRAM modules such as double data rate synchronous dynamic random-access memory (DDR SDRAM). In some implementations, the processing apparatus 612 may include a digital signal processor (DSP). In some implementations, the processing apparatus 612 may include an application specific integrated circuit (ASIC). For example, the processing apparatus 612 may include a custom image signal processor.

The first image sensor 614 and the second image sensor 616 are configured to detect light of a certain spectrum (e.g., the visible spectrum or the infrared spectrum) and convey information constituting an image as electrical signals (e.g., analog or digital signals). For example, the image sensors 614 and 616 may include charge-coupled devices (CCD) or active pixel sensors in complementary metal-oxide-semiconductor (CMOS). The image sensors 614 and 616 may detect light incident through respective lens (e.g., a fisheye lens). In some implementations, the image sensors 614 and 616 include digital to analog converters. In some implementations, the image sensors 614 and 616 are held in a fixed orientation with respective fields of view that overlap. For example, the image sensors 614 and 616 may be configured to capture image data using a plurality of selectable exposure times.

The image capture device 610 may include the communications interface 618, which may enable communications with a personal computing device (e.g., a smartphone, a tablet, a laptop computer, or a desktop computer). For example, the communications interface 618 may be used to receive commands controlling image capture and processing in the image capture device 610. For example, the communications interface 618 may be used to transfer image data to a personal computing device. For example, the communications interface 618 may include a wired interface, such as a high-definition multimedia interface (HDMI), a universal serial bus (USB) interface, or a FireWire interface. For example, the communications interface 618 may include a wireless interface, such as a Bluetooth interface, a ZigBee interface, and/or a Wi-Fi interface.

The image capture device 610 may include the user interface 620. For example, the user interface 620 may include an LCD display for presenting images and/or messages to a user. For example, the user interface 620 may include a button or switch enabling a person to manually turn the image capture device 610 on and off. For example, the user interface 620 may include a shutter button for snapping pictures.

The image capture device 610 may include the battery 622 that powers the image capture device 610 and/or its peripherals. For example, the battery 622 may be charged wirelessly or through a micro-USB interface.

FIG. 6B is a block diagram of an example of a system 630 configured for image capture and denoising of chrominance channels. The system 630 includes an image capture device 640 that communicates via a communications link 650 with a personal computing device 660. The image capture device 640 includes a first image sensor 642 and a second image sensor 644 that are configured to capture respective images. The image capture device 640 includes a communications interface 646 configured to transfer images via the communication link 650 to the personal computing device 660. The personal computing device 660 includes a processing apparatus 662, a user interface 664, and a communications interface 666. The processing apparatus 662 is configured to receive, using the communications interface 666, a first image from the first image sensor 642, and receive a second image from the second image sensor 644. The processing apparatus 662 may be configured to perform image signal processing (e.g., denoising, stitching, and/or encoding) to generated composite images based on image data from the image sensors 642 and 644. The system 630 may be used to implement processes described in this disclosure, such as the process 800 of FIG. 8 and/or the process 900 of FIG. 9.

The first image sensor 642 and the second image sensor 644 are configured to detect light of a certain spectrum (e.g., the visible spectrum or the infrared spectrum) and convey information constituting an image as electrical signals (e.g., analog or digital signals). For example, the image sensors 642 and 644 may include charge-coupled devices (CCD) or active pixel sensors in complementary metal-oxide-semiconductor (CMOS). The image sensors 642 and 644 may detect light incident through respective lens (e.g., a fisheye lens). In some implementations, the image sensors 642 and 644 include digital to analog converters. In some implementations, the image sensors 642 and 644 are held in a fixed relative orientation with respective fields of view that overlap. For example, the image sensors 642 and 644 may be configured to capture image data using a plurality of selectable exposure times. Image signals from the image sensors 642 and 644 may be passed to other components of the image capture device 640 via a bus 648.

The communications link 650 may be wired communications link or a wireless communications link. The communications interface 646 and the communications interface 666 may enable communications over the communications link 650. For example, the communications interface 646 and the communications interface 666 may include a high-definition multimedia interface (HDMI), a universal serial bus (USB) interface, a FireWire interface, a Bluetooth interface, a ZigBee interface, and/or a Wi-Fi interface. For example, the communications interface 646 and the communications interface 666 may be used to transfer image data from the image capture device 640 to the personal computing device 660 for image signal processing (e.g., denoising, stitching, and/or encoding) to generated composite images based on image data from the image sensors 642 and 644.

The processing apparatus 662 may include one or more processors having single or multiple processing cores. The processing apparatus 662 may include memory, such as random access memory device (RAM), flash memory, or any other suitable type of storage device such as a non-transitory computer readable memory. The memory of the processing apparatus 662 may include executable instructions and data that can be accessed by one or more processors of the processing apparatus 662. For example, the processing apparatus 662 may include one or more DRAM modules such as double data rate synchronous dynamic random-access memory (DDR SDRAM). In some implementations, the processing apparatus 662 may include a digital signal processor (DSP). In some implementations, the processing apparatus 662 may include an application specific integrated circuit (ASIC). For example, the processing apparatus 662 may include a custom image signal processor. The processing apparatus 662 may exchange data (e.g., image data) with other components of the personal computing device 660 via the bus 668.

The personal computing device 660 may include the user interface 664. For example, the user interface 664 may include a touchscreen display for presenting images and/or messages to a user and receiving commands from a user. For example, the user interface 664 may include a button or switch enabling a person to manually turn the personal computing device 660 on and off In some implementations, commands (e.g., start recording video, stop recording video, or snap photograph) received via the user interface 664 may be passed on to the image capture device 640 via the communications link 650.

Non-local means noise reduction processing may be applied to images passing through an image processing pipeline. Non-local means noise reduction processing averages similar pixel values from a single image to reduce the noise levels in those pixels. Weighted averages of pixels from an image may be used to determine denoised pixel values. A given weight in a set of weights may depend on a measure of similarity (e.g., a difference in pixel values) between a subject pixel, which is being updated using the weight, and a candidate pixel, which may be multiplied by the weight and used to update the subject pixel. Once determined, a set of weights used for non-local means denoising, may be iteratively applied to an image multiple times to iteratively reduce the noise levels of pixels in the image. In some implementations, a non-local means noise reduction processing may be guided in the sense that it applies information from one color channel (e.g., a luminance channel) to filtering another color channel (e.g., one or more chrominance channels).

Figure 7:
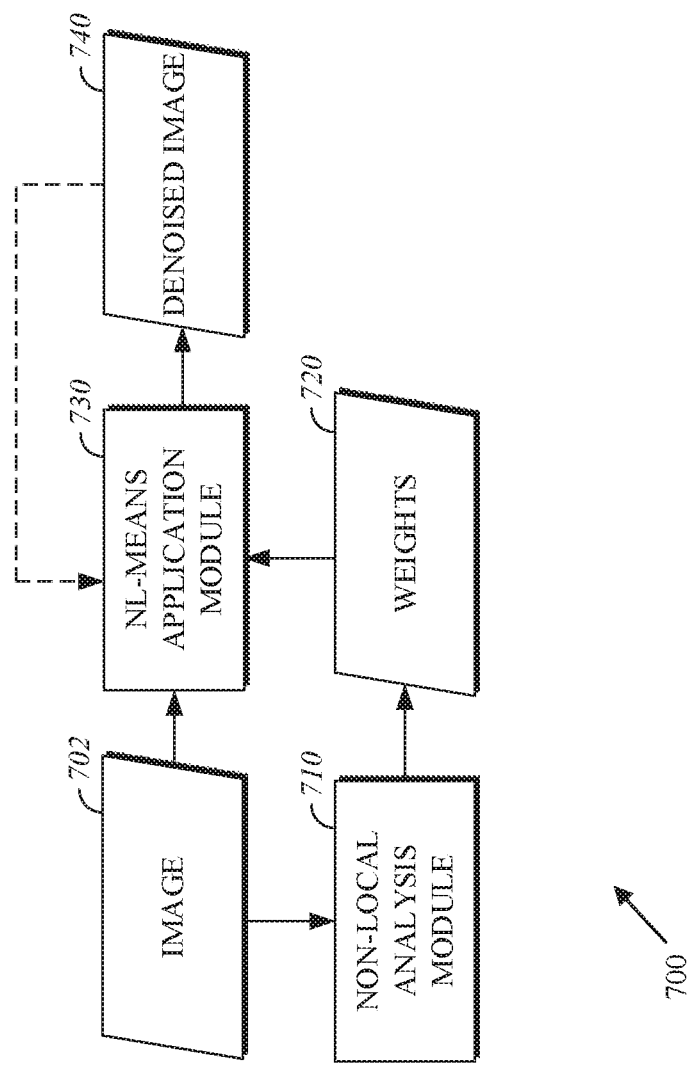
FIG. 7 is a block diagram of an example of a non-local means noise reduction module that is configured to perform denoising of chrominance channels.

FIG. 7 is a block diagram of an example of a non-local means noise reduction module 700. The non-local means noise reduction module 700 may be configured to perform denoising of chrominance channels. The non-local means noise reduction module 700 takes an image 702 as input and processes the image with a non-local analysis module 710 to determine a set of weights 720 for the image 702. For example, the non-local analysis module 710 may determine the set of weights based on a luminance channel of the image 702. In some implementations, the non-local analysis module 710 may determine the set of weights based on a luminance channel and chrominance channels of the image 702. A non-local means application module 730 applies the set of weights 720 to one or more chrominance channels of the image 702 to determine a denoised image 740. In some implementations, the non-local means application module 730 may iteratively apply the set of weights 720 to chrominance channels of the denoised image 740 to further reduce the noise levels of pixels in the denoised image 740. After multiple applications of the set of weights 720, the denoised image that results may be output for further processing in an image signal processing pipeline. For example, the non-local means noise reduction module 700 may implement the process 800 of FIG. 8. For example, the non-local means noise reduction module 700 may implement the process 900 of FIG. 9.

Operations performed by the non-local analysis module 710 may be significantly more computationally complex than the operations performed by the non-local means application module 730. Significant reductions of noise level may be achieved efficiently by iteratively applying the set of weights 720 to the denoised image 740 with the non-local means application module 730.

Figure 8:
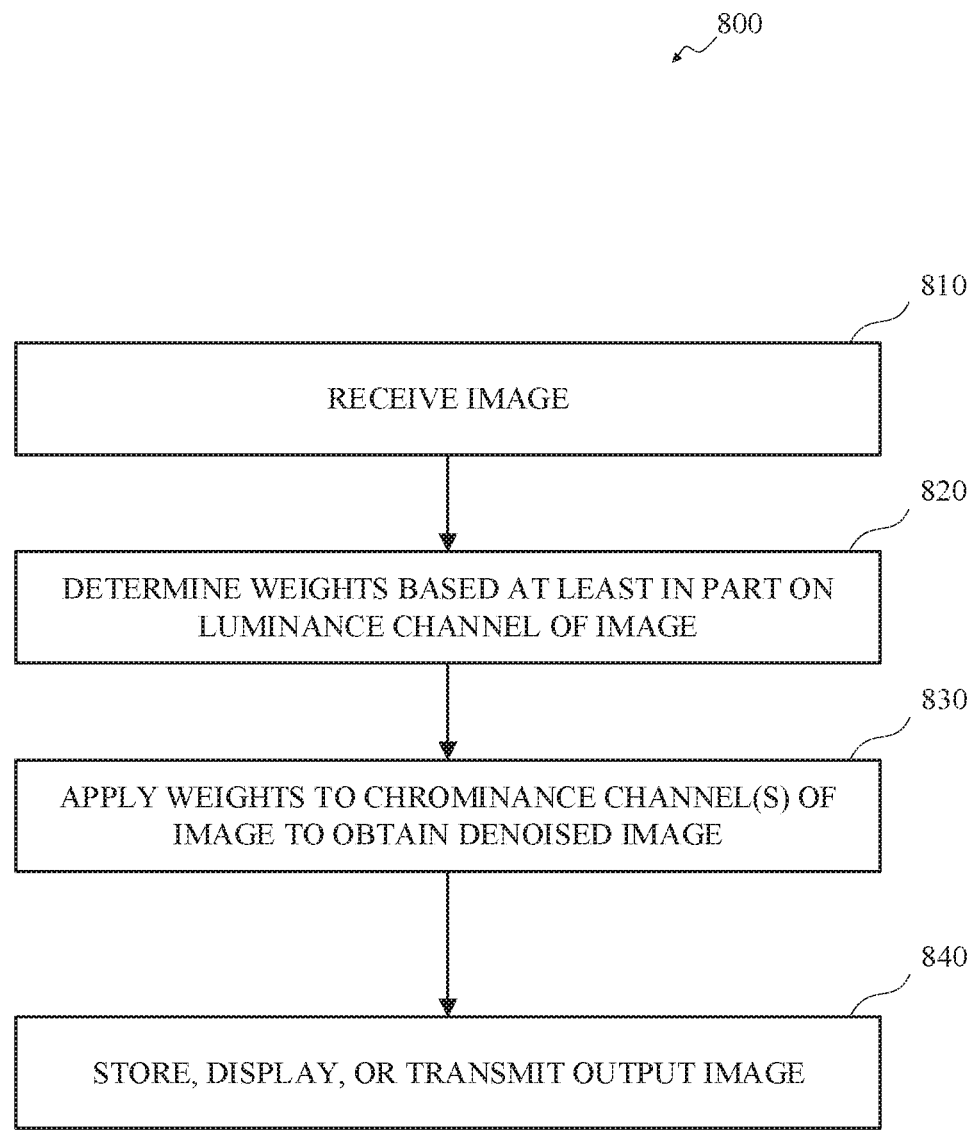
FIG. 8 is a flowchart of an example of a process for applying non-local means noise reduction to chrominance channels of images.

FIG. 8 is a flowchart of an example of a process 800 for applying non-local means noise reduction to chrominance channels of images. The process 800 includes receiving 810 an image; determining 820 a set of non-local means weights for the image based on a luminance channel of the image; applying 830 the set of non-local means weights to a chrominance channel of the image to obtain a denoised image; and storing, displaying, or transmitting 840 an output image based on the denoised image. For example, the process 800 may be implemented by the system 600 of FIG. 6A or the system 630 of FIG. 6B. For example, the process 800 may be implemented by an image capture device, such the image capture device 610 shown in FIG. 6A, or an image capture apparatus, such as the image capture apparatus 110 shown in FIG. 1 or the image capture apparatus 300 of FIG. 3. For example, the process 800 may be implemented by the image processing and coding pipeline 400 of FIG. 4A. For example, the process 800 may be implemented by the receiving station image processing pipeline 450 of FIG. 4B. For example, the process 800 may be implemented by a personal computing device, such as the personal computing device 660. For example, the process 800 may be implemented using a processing apparatus (e.g., the processing apparatus 612) that includes an image signal processor (e.g., the image signal processor 500). For example, the process 800 may be implemented by the non-local means noise reduction module 700 of FIG. 7.

The process 800 includes receiving 810 an image (e.g., a still image or a frame of video) from one or more image sensors. The image sensor(s) may be part of an image capture apparatus (e.g., the image capture apparatus 110, the image capture apparatus 300, the image capture device 610, or the image capture device 640). For example, the image may be received 810 from the image sensor via a bus (e.g., the bus 624 or image signal processor bus 590). In some implementations, the image may be received 810 via a communications link (e.g., the communications link 650). For example, the image may be received 810 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the image may be received 810 via communications interface 666. For example, the image may be received 810 via a front ISP (e.g., the front ISP 510) that performs some initial processing on the received image. For example, the image may represent each pixel value in a defined format, such as in a RAW image signal format, a YUV image signal format, or a compressed format (e.g., an MPEG or JPEG compressed bitstream). For example, the image be stored in a format using the Bayer color mosaic pattern. In some implementations, the image may be a frame of video. In some implementations, the image received 810 is a combined image composed of multiple images from multiple respective image sensors that have been stitched together to form the combined image with a shared field of view.

The process 800 includes determining 820 a set of weights for the image based on a luminance channel of the image. The set of weights may include a set of non-local means weights for the image. In some implementations, the image is converted to a color space with a luminance channel (e.g., converted from an RGB color space to a Y'UV, YUV, YCbCr, or YPbPr color space) to enable determination of the set of weights and their application to one or more corresponding color channels in the color space. A weight in the set of weights may correspond to a subject pixel and a candidate pixel and may be determined 820 based on luminance values of one or more pixels of the image centered at the subject pixel and one or more pixels of the image centered at the candidate pixel. In some implementations, for each pixel of the image there is a subset of the set of weights that corresponds to that pixel as subject, and the subset includes weights respectively associated with a plurality of other pixels that are candidates for that pixel. The candidates for the subject pixel may be pixels of the image in an area centered at the subject pixel. For example, the weights may be determined 820 as:

$$W(S,C)=f(\Sigma_{x_m=-M}^{x_m=M}\Sigma_{y_m=-M}^{y_m=M}(|Y(x_s+x_c+x_m,y_s+y_c+y_m)-Y(x_s+x_m,y_s+y_m)|)))$$ [Equation 1]

where S is a subject pixel that will be denoised, C is a candidate pixel that may be used to denoise S, $x_s$ and $y_s$ are the coordinates of the subject pixel S and can vary over the range of pixel positions for the image, $x_c$ and $y_c$ are the coordinate offsets of the candidate pixel C with respect to the subject pixel S, W(S, C) is a weight that will be multiplied by the candidate pixel C value as part of determining a denoised value of the subject pixel S, M is a constant (e.g., M=0, M=1, or M=2) specifying the size of a square matching mask of size (2M+1) by (2M+1) pixels, $x_m$ and $y_m$ are coordinate offsets within the matching mask, Y(x, y) is a pixel luminance value of the image at the coordinates (x, y), and f( ) is a similarity cost function (e.g., a Gaussian function). The similarity cost function f( ) may be non-negative. The similarity cost function f( ) may monotonically decrease in the range between f(0)=1 and f(x)=0 when x is larger than a threshold (e.g., the threshold may be an expected noise level of a pixel value of the image). In some implementations, the similarity cost function f(x)=0.5 when x is equal to an expected noise level on the luminance channel of the image. For example, a subset of the weights W(S, C) may be determined 820 for each pixel in the image as the subject pixel. The subject of weights for a subject pixel may include weights respectively associated with the subject pixels and a set of candidate pixels in the image. For example, the candidate pixels for a subject pixel may include all pixels located within a maximum distance (e.g., up to 2, 3, 4, or 5 pixels away in each dimension) from the subject pixel. W(S, C) may represent the contribution of a pixel located at coordinates $(x_c, y_c)$ to compute the pixel located at coordinates $(x_s, y_s)$.

Determining 820 the set of weights may include determining 820 the set of weights (e.g., a set of non-local means weights) for the image based on chrominance channels of the image. For example, determining 820 a weight of the set of weights may include determining a first difference between a luminance value of the subject pixel and a luminance value of the candidate pixel; determining a second difference between a first chrominance value of the subject pixel and a first chrominance value of the candidate pixel; determining a third difference between a second chrominance value of the subject pixel and a second chrominance value of the candidate pixel; determining a sum of magnitudes of the first difference, the second difference, and the third difference; and determining the weight based on the sum. For example, the weights may be determined 820 as:

$$W(S,C) = f(\Sigma_{x_m=-M}^{x_m=M}(\Sigma_{y_m=-M}^{y_m=M}(|Y(x_s+x_c+x_m,y_s+y_c+y_m)-Y(x_s+x_m,y_s+y_m)|+\alpha|U(x_s+x_c+x_m,y_s+y_c+y_m)-U(x_s+x_m,y_s+y_m)|+\beta|V(x_s+x_c+x_m,y_s+y_c+y_m)-V(x_s+x_m,y_s+y_m)|))) \quad \text{[Equation 2]}$$

where U(x, y) is a first chrominance channel value of a pixel of the image at the coordinates (x, y), V(x, y) is a second chrominance channel value of a pixel of the image at the coordinates (x, y), a is constant (e.g., 0.5) that specifies a relative significance differences on the first chrominance channel, and is a constant (e.g., 0.5) that specifies a relative significance differences on the second chrominance channel. Determining 820 the set weights according to Equation 2, rather than Equation 1, may facilitate taking into account color edges, i.e., edges around which U and V have abrupt changes while Y has similar values on both sides of the edge.

Determining 820 a weight in the set of weights may include determining a difference between a luminance value of the subject pixel and a luminance value of the candidate pixel. This difference may reflect a similarity between the subject pixel and the candidate pixel. For example, the weight (e.g., of a set of non-local means weights) may be determined based on a magnitude of the difference. In some implementations, the weight (e.g., of a set of non-local means weights) may be determined as a Gaussian function of the difference. Some implementations determine a sum of absolute values of differences between respective pixels in a first area of the image centered at the subject pixel and corresponding respective pixels of a matching area of the image centered at the candidate pixel (e.g., with areas corresponding to a matching mask of Equation 1 or Equation 2). The weight (e.g., of a set of non-local means weights) may be determined based on the sum. For example, the first area may be a square block of pixels and the matching area may be a square block of pixels of a same size.

The process 800 includes applying 830 the set of weights to one or more chrominance channels of the image to obtain a denoised image. The set of weights may include a set of non-local means weights for the image. A subject pixel of the denoised image may be determined based on a weight (from the set of weights) multiplied by a candidate pixel of the image. For example, a subject pixel of the denoised image may be determined by applying 830 the set of weights to determine a weighted average of candidate pixels of the image for the subject pixel. For example, the set of weights may be applied 830 to a chrominance channel of the image according to:

$$U'(x_s,y_s) = (\Sigma_{x_c=-N}^{x_c=N}(\Sigma_{y_c=-N}^{y_c=N}(W(S,(x_c,y_c))*U(x_s+x_c,y_s+y_c))))/(\Sigma_{x_c=-N}^{x_c=N}(\Sigma_{y_c=-N}^{y_c=N}(W(S,(x_c,y_c))))) \quad \text{[Equation 3]}$$

where U'(x, y) is a first chrominance channel value of a pixel of the denoised image at the coordinates (x, y), N is a constant (e.g., N=2, N=3, N=4, or M=5) specifying the size of a square block of candidate pixels of size (2N+1) by (2N+1) pixels, and $x_c$ and $y_c$ are coordinate offsets within the block of candidate pixels. In some implementations, the set of weights are applied 830 to a second chrominance channel of the image to obtain the denoised image. For example, the set of weights may be applied 830 to a second chrominance channel of the image according to:

$$V'(x_s,y_s) = (\Sigma_{x_c=-N}^{x_c=N}(\Sigma_{y_c=-N}^{y_c=N}(W(S,(x_c,y_c))*V(x_s+x_c,y_s+y_c))))/(\Sigma_{x_c=-N}^{x_c=N}(\Sigma_{y_c=-N}^{y_c=N}(W(S,(x_c,y_c))))) \quad \text{[Equation 4]}$$

where V'(x, y) is a second chrominance channel value of a pixel of the denoised image at the coordinates (x, y).

The process 800 includes storing, displaying, or transmitting 840 an output image based on the denoised image. For example, the output image may be transmitted 840 to an external device (e.g., a personal computing device) for display or storage. For example, the output image may be the same as the denoised image. For example, the output image may be a composite image determined by stitching an image based on the denoised image to one or more images from other image sensors with overlapping fields of view. For example, the output image may be compressed using an encoder (e.g., an MPEG encoder). For example, the output image may be transmitted 840 via the communications interface 618. For example, the output image may be displayed 840 in the user interface 620 or in the user interface 664. For example, the output image may be stored 840 in memory of the processing apparatus 612 or in memory of the processing apparatus 662.

The denoising of chrominance channels may be performed at a number of different stages in an image (e.g., a still image or video) coding pipeline to improve image quality. In some implementations, the image is received 810 from an image signal processor (e.g., the image signal processor 410) and the denoised image is input to an encoder (e.g., the encoder 430). In some implementations, the image is received 810 from a decoder (e.g., the decoder 460). In some implementations, the process 800 is performed by an image signal processor (e.g., the image signal processor 500) once the image has been converted to an appropriate color space (e.g., a YUV color space).

Figure 9:
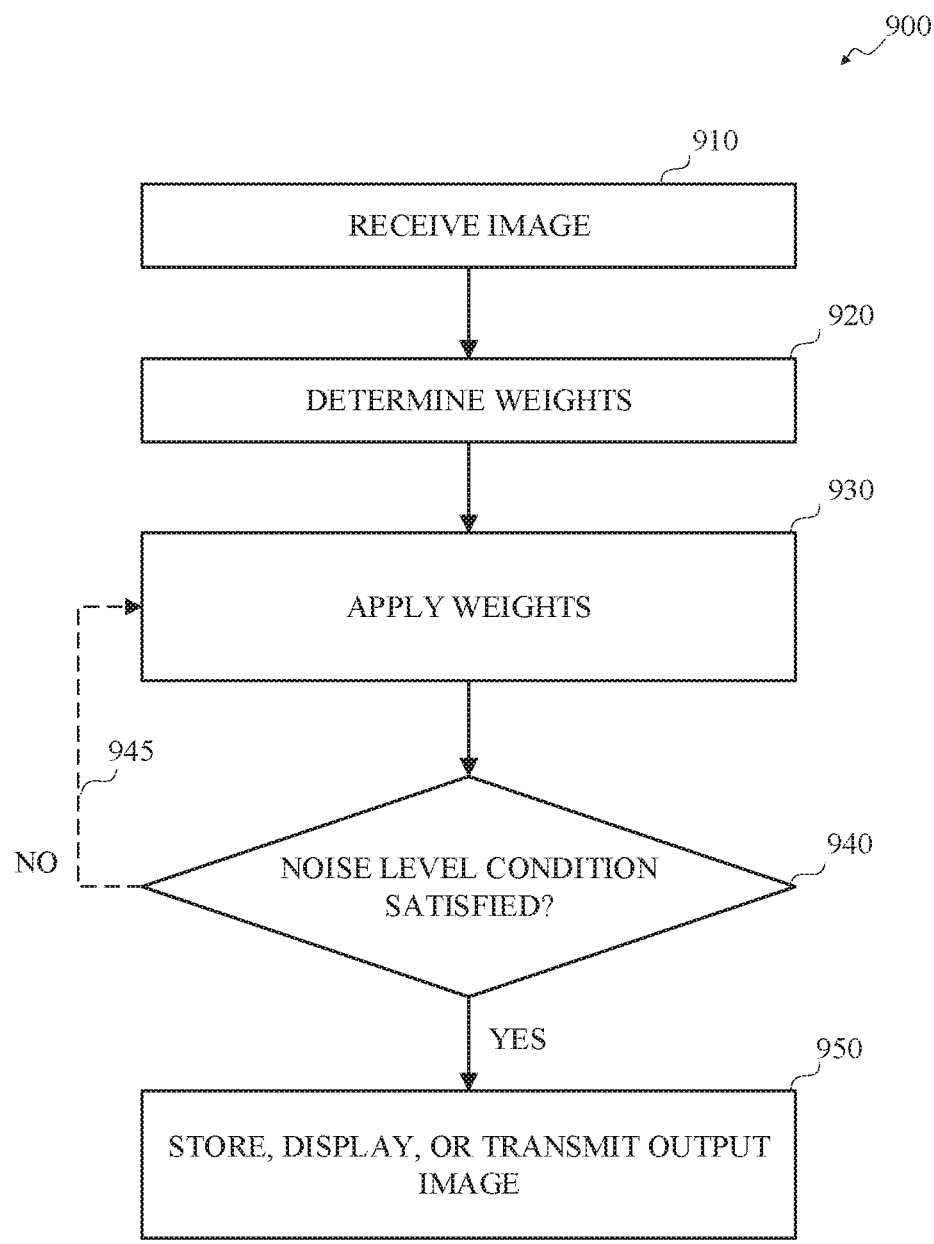
FIG. 9 is a flowchart of an example of a process for iteratively applying non-local means noise reduction to chrominance channels of images.

FIG. 9 is a flowchart of an example of a process 900 for iteratively applying non-local means noise reduction to chrominance channels of images. The process 900 includes receiving 910 an image from an image sensor; determining 920 a set of non-local means weights for the image; applying 930 the set of non-local means weights to the image to obtain a denoised image; checking 940 whether a noise level of the denoised image satisfies a condition; when (at 945) the condition is not satisfied, iteratively applying 930 the set of non-local means weights to the denoised image until the condition is satisfied to obtain a final denoised image; and, when the condition is satisfied, storing, displaying, or transmitting 950 an output image based on the final denoised image. For example, the process 900 may be implemented by the system 600 of FIG. 6A or the system 630 of FIG. 6B. For example, the process 900 may be implemented by an image capture device, such the image capture device 610 shown in FIG. 6A, or an image capture apparatus, such as the image capture apparatus 110 shown in FIG. 1 or the image capture apparatus 300 of FIG. 3. For example, the process 900 may be implemented by the image processing and coding pipeline 400 of FIG. 4A. For example, the process 900 may be implemented by the receiving station image processing pipeline 450 of FIG. 4B. For example, the process 900 may be implemented by a personal computing device, such as the personal computing device 660. For example, the process 900 may be implemented using a processing apparatus (e.g., the processing apparatus 612) that includes an image signal processor (e.g., the image signal processor 500). For example, the process 900 may be implemented by the non-local means noise reduction module 700 of FIG. 7.

The process 900 includes receiving 910 an image (e.g., a still image or a frame of video) from an image sensor. The image sensor may be part of an image capture apparatus (e.g., the image capture apparatus 110, the image capture apparatus 300, the image capture device 610, or the image capture device 640). For example, the image may be received 910 from the image sensor via a bus (e.g., the bus 624 or image signal processor bus 590). In some implementations, the image may be received 910 via a communications link (e.g., the communications link 650). For example, the image may be received 910 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the image may be received 910 via communications interface 666. For example, the image may be received 910 via a front ISP (e.g., the front ISP 510) that performs some initial processing on the received image. For example, the image may represent each pixel value in a defined format, such as in a RAW image signal format, a YUV image signal format, or a compressed format (e.g., an MPEG or JPEG compressed bitstream). For example, the image be stored in a format using the Bayer color mosaic pattern. In some implementations, the image may be a frame of video. In some implementations, the image received 910 is a combined image composed of multiple images from multiple respective image sensors that have been stitched together to form the combined image with a shared field of view.

The process 900 includes determining 920 a set of weights for the image based on a luminance channel of the image. The set of weights may include a set of non-local means weights for the image. In some implementations, the image is converted to a color space with a luminance channel (e.g., converted from an RGB color space to a Y'UV, YUV, YCbCr, or YPbPr color space) to enable determination of the set of weights and their application to one or more corresponding color channels in the color space. A weight in the set of weights may correspond to a subject pixel and a candidate pixel and may be determined 920 based on luminance values of one or more pixels of the image centered at the subject pixel and one or more pixels of the image centered at the candidate pixel. In some implementations, for each pixel of the image there is a subset of the set of weights that corresponds to that pixel as subject, and the subset includes weights respectively associated with a plurality of other pixels that are candidates for that pixel. The candidates for the subject pixel may be pixels of the image in an area centered at the subject pixel. Determining 820 the set of weights may include determining 820 the set of weights (e.g., a set of non-local means weights) for the image based on chrominance channels of the image. For example, the weights may be determined 920 using Equation 1 or Equation 2. For example, a subset of the weights W(S, C) may be determined 920 for each pixel in the image as the subject pixel. The subset of weights for a subject pixel may include weights respectively associated with the subject pixels and a set of candidate pixels in the image. For example, the candidate pixels for a subject pixel may include all pixels located within a maximum distance (e.g., up to 2, 3, 4, or 5 pixels away in each dimension) from the subject pixel. W(S, C) may represent the contribution of a pixel located at coordinates $(x_c, y_c)$ to compute the pixel located at coordinates $(x_s, y_s)$.

Determining 920 a weight in the set of weights may include determining a difference between a luminance value of the subject pixel and a luminance value of the candidate pixel. This difference may reflect a similarity between the subject pixel and the candidate pixel. For example, the weight (e.g., of a set of non-local means weights) may be determined based on a magnitude of the difference. In some implementations, the weight (e.g., of a set of non-local means weights) may be determined as a Gaussian function of the difference. In some implementations, a sum of absolute values of differences between respective pixels in a first area of the image centered at the subject pixel and corresponding respective pixels of a matching area of the image centered at the candidate pixel (e.g., with areas corresponding to a matching mask of Equation 1 or Equation 2); and the weight (e.g., of a set of non-local means weights) is determined based on the sum. For example, the first area may be a square block of pixels and the matching area may be a square block of pixels of a same size.

The process 900 includes iteratively applying 930 the set of weights to a chrominance channel of an image (e.g., the image or a denoised image) until a condition is satisfied to obtain a denoised image. The set of weights may include a set of non-local means weights for the image. A subject pixel of a next denoised image may be determined based on a weight (from the set of weights) multiplied by a candidate pixel of the image or a previous denoised image based on the image. For example, a subject pixel of the first denoised image may be determined by applying 930 the set of weights to determine a weighted average of candidate pixels of the image for the subject pixel. For example, the set of weights may be iteratively applied 930 to a chrominance channel of the image according to:

$$U_{n+1}(x_s,y_s) = (\Sigma_{x_c=-N}^{x_c=N}(\Sigma_{y_c=-N}^{y_c=N}(W(S,(x_c,y_c))*U_n(x_s+x_c,y_s+y_c))))/(\Sigma_{x_c=-N}^{x_c=N}(\Sigma_{y_c=-N}^{y_c=N}(W(S,(x_c,y_c)))))$$ [Equation 5]

where $U_n(x, y)$ is a first chrominance channel value of a pixel of the n-th denoised image at the coordinates (x, y), n is a iteration index taking non-negative integer values with n=0 corresponding to the image received 910, n=1 corresponding to a first denoised image, n=2 corresponding to a second denoised image, n=3 corresponding to a third denoised image, etc. In some implementations, the set of weights are iteratively applied 930 to a second chrominance channel of the image to obtain the denoised image. For example, the set of weights may be applied 930 to a second chrominance channel of the image according to:

$$V_{n+1}(x_s,y_s) = (\Sigma_{x_c=-N}^{x_c=N}(\Sigma_{y_c=-N}^{y_c=N}(W(S,(x_c,y_c))*V_n(x_s+x_c,y_s+y_c))))/(\Sigma_{x_c=-N}^{x_c=N}(\Sigma_{y_c=-N}^{y_c=N}(W(S,(x_c,y_c)))))$$ [Equation 6]

where $V_n(x, y)$ is a second chrominance channel value of a pixel of the n-th denoised image at the coordinates (x, y). A noise map for the previous image may be updated based on the set of weights to determine a noise map for the current denoised image. For example, a noise map including noise level estimates (e.g., standard deviations or variances) for respective pixel values may be updated based on a sum of squares of the noise level estimates for corresponding candidate pixels and their respective weights from the set of weights.

The process 900 includes checking 940 whether a noise level of a current denoised image (e.g., a second denoised image) satisfies the condition. For example, a noise level estimate from a noise map may be compared to a threshold to check 940 whether the condition is satisfied. For example, a maximum noise level estimate from across the image portions of a noise map may be compared to the threshold. For example, an average noise level estimate from across the image portions of a noise map may be compared to the threshold. If the condition is not satisfied (at 945) a next iteration of iteratively applying 930 the set of weights to one or more chrominance channels of the denoised image may be performed. In some implementations (not shown), the number of iterations is capped at a maximum number of iterations (e.g., 2, 3, 4, or 5 iterations), i.e., the next iteration is performed if the condition is not yet satisfied and the maximum number of iterations has not yet been performed.

The process 900 includes storing, displaying, or transmitting 950 an output image based on the current denoised image. For example, the output image may be transmitted 950 to an external device (e.g., a personal computing device) for display or storage. For example, the output image may be the same as the current denoised image. For example, the output image may be a composite image determined by stitching an image based on the current denoised image to one or more images from other image sensors with overlapping fields of view. For example, the output image may be compressed using an encoder (e.g., an MPEG encoder). For example, the output image may be transmitted 950 via the communications interface 618. For example, the output image may be displayed 950 in the user interface 620 or in the user interface 664. For example, the output image may be stored 950 in memory of the processing apparatus 612 or in memory of the processing apparatus 662.

The denoising of chrominance channels may be performed at a number of different stages in an image (e.g., a still image or video) coding pipeline to improve image quality. In some implementations, the image is received 910 from an image signal processor (e.g., the image signal processor 410) and the denoised image is input to an encoder (e.g., the encoder 430). In some implementations, the image is received 910 from a decoder (e.g., the decoder 460). In some implementations, the process 900 is performed by an image signal processor (e.g., the image signal processor 500) once the image has been converted to an appropriate color space (e.g., a YUV color space).

Where certain elements of these implementations may be partially or fully implemented using known components, those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared or another type of communication medium. The exact topology of the bus could be, for example, standard "bus," hierarchical bus, network-on-chip, address-event-representation (AER) connection, or other type of communication topology used for accessing, e.g., different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smart phones, personal integrated communication or entertainment devices, or literally any other device capable of executing a set of instructions.

As used herein, the term "computer program" or "software" is meant to include any sequence of machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, Standard Generalized Markup Language (SGML), XML, Voice Markup Language (VoxML)), as well as object-oriented environments such as the Common Object Request Broker Architecture (CORBA), Java™ (including J2ME, Java Beans), and/or Binary Runtime Environment (e.g., Binary Runtime Environment for Wireless (BREW)).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), dynamic random access memory (DRAM), Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory (e.g., NAND/NOR), memristor memory, and pseudo SRAM (PSRAM).

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose complex instruction set computing (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variations), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or out-of-band, cable modem, and/or other radio frequency tuner protocol interfaces), Wi-Fi (802.11), WiMAX (802.16), personal area network (PAN) (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA)(e.g., IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, cellular Digital Packet Data (CDPD), satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are illustrative of the broader methods of the disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within the disclosure.

While the above-detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technology.

What is claimed is:

1. A system comprising:
   an image sensor configured to capture an image; and
   a processing apparatus configured to:
   receive the image from the image sensor;
   determine a set of weights for the image based on a luminance channel of the image, wherein a weight in the set of weights corresponds to a subject pixel and a candidate pixel and is determined based on luminance values of one or more pixels of the image centered at the subject pixel and one or more pixels of the image centered at the candidate pixel;
   apply the set of weights to a chrominance channel of the image to obtain a denoised image, wherein the subject pixel of the denoised image is determined based on the weight multiplied by the candidate pixel of the image; and
   store, display, or transmit an output image based on the denoised image.

2. The system of claim 1, in which the processing apparatus is configured to:
   determine the set of weights for the image based on chrominance channels of the image.

3. The system of claim 2, in which the processing apparatus is configured to:
   determine a first difference between a luminance value of the subject pixel and a luminance value of the candidate pixel;
   determine a second difference between a first chrominance value of the subject pixel and a first chrominance value of the candidate pixel;
   determine a third difference between a second chrominance value of the subject pixel and a second chrominance value of the candidate pixel;
   determine a sum of magnitudes of the first difference, the second difference, and the third difference; and
   determine the weight based on the sum.

4. The system of claim 1, in which the image is received from an image signal processor and the denoised image is input to an encoder.

5. The system of claim 1, in which the image is received from a decoder.

6. The system of claim 1, in which the chrominance channel is a first chrominance channel and the processing apparatus is configured to:
   apply the set of weights to a second chrominance channel of the image to obtain the denoised image.

7. The system of claim 1, in which, for each pixel of the image there is a subset of the set of weights that corresponds to that pixel as subject, and the subset includes weights respectively associated with a plurality of other pixels that are candidates for that pixel.

8. The system of claim 7, in which the candidates for the subject pixel are pixels of the image in an area centered at the subject pixel.

9. The system of claim 1, in which the processing apparatus is configured to:
   determine a difference between a luminance value of the subject pixel and a luminance value of the candidate pixel; and
   determine the weight based on a magnitude of the difference.

10. The system of claim 1, in which the processing apparatus is configured to:
    determine a difference between a luminance value of the subject pixel and a luminance value of the candidate pixel; and
    determine the weight as a Gaussian function of the difference.

11. The system of claim 1, in which the processing apparatus is configured to:
    determine a sum of absolute values of differences between respective pixels in a first area of the image centered at the subject pixel and corresponding respective pixels of a matching area of the image centered at the candidate pixel; and
    determine the weight based on the sum.

12. The system of claim 11, in which the first area is a square block of pixels and the matching area is a square block of pixels of a same size.

13. The system of claim 1, in which the processing apparatus is configured to:
    check whether a noise level of the denoised image satisfies a condition; and
    iteratively apply the set of weights to the chrominance channel of the denoised image until the condition is satisfied.

14. A method comprising:
    receiving an image from one or more image sensors;
    determining a set of weights for the image based on a luminance channel of the image, wherein a weight in the set of weights corresponds to a subject pixel and a candidate pixel and is determined based on luminance values of one or more pixels of the image centered at the subject pixel and one or more pixels of the image centered at the candidate pixel;
    applying the set of weights to chrominance channels of the image to obtain a denoised image, wherein the subject pixel of the denoised image is determined based on the weight multiplied by the candidate pixel of the image; and
    storing, displaying, or transmitting an output image based on the denoised image.

15. The method of claim 14, comprising:
    determining the set of weights for the image based on the chrominance channels of the image.

16. The method of claim 15, comprising:
    determining a first difference between a luminance value of the subject pixel and a luminance value of the candidate pixel;
    determining a second difference between a first chrominance value of the subject pixel and a first chrominance value of the candidate pixel;
    determining a third difference between a second chrominance value of the subject pixel and a second chrominance value of the candidate pixel;
    determining a sum of magnitudes of the first difference, the second difference, and the third difference; and
    determining the weight based on the sum.

17. The method of claim 14, in which the image is received from an image signal processor and the denoised image is input to an encoder.

18. A non-transitory computer-readable storage medium storing instructions that, when executed by a processor, cause the processor to perform operations to:
    receive an image from one or more image sensors;
    determine a set of weights for the image based on a luminance channel of the image, wherein a weight in the set of weights corresponds to a subject pixel and a candidate pixel and is determined based on luminance values of one or more pixels of the image centered at the subject pixel and one or more pixels of the image centered at the candidate pixel;
    apply the set of weights to chrominance channels of the image to obtain a denoised image, wherein the subject pixel of the denoised image is determined based on the weight multiplied by the candidate pixel of the image; and
    store, display, or transmit an output image based on the denoised image.

19. The non-transitory computer-readable storage medium of claim 18, storing instructions that, when executed by a processor, cause the processor to perform operations to:
    determine the set of weights for the image based on the chrominance channels of the image.

20. The non-transitory computer-readable storage medium of claim 19, storing instructions that, when executed by a processor, cause the processor to perform operations to:
    determine a first difference between a luminance value of the subject pixel and a luminance value of the candidate pixel;
    determine a second difference between a first chrominance value of the subject pixel and a first chrominance value of the candidate pixel;
    determine a third difference between a second chrominance value of the subject pixel and a second chrominance value of the candidate pixel;
    determine a sum of magnitudes of the first difference, the second difference, and the third difference; and
    determine the weight based on the sum.

* * * * *